June 28, 1932.  F. A. HAYES  1,865,102

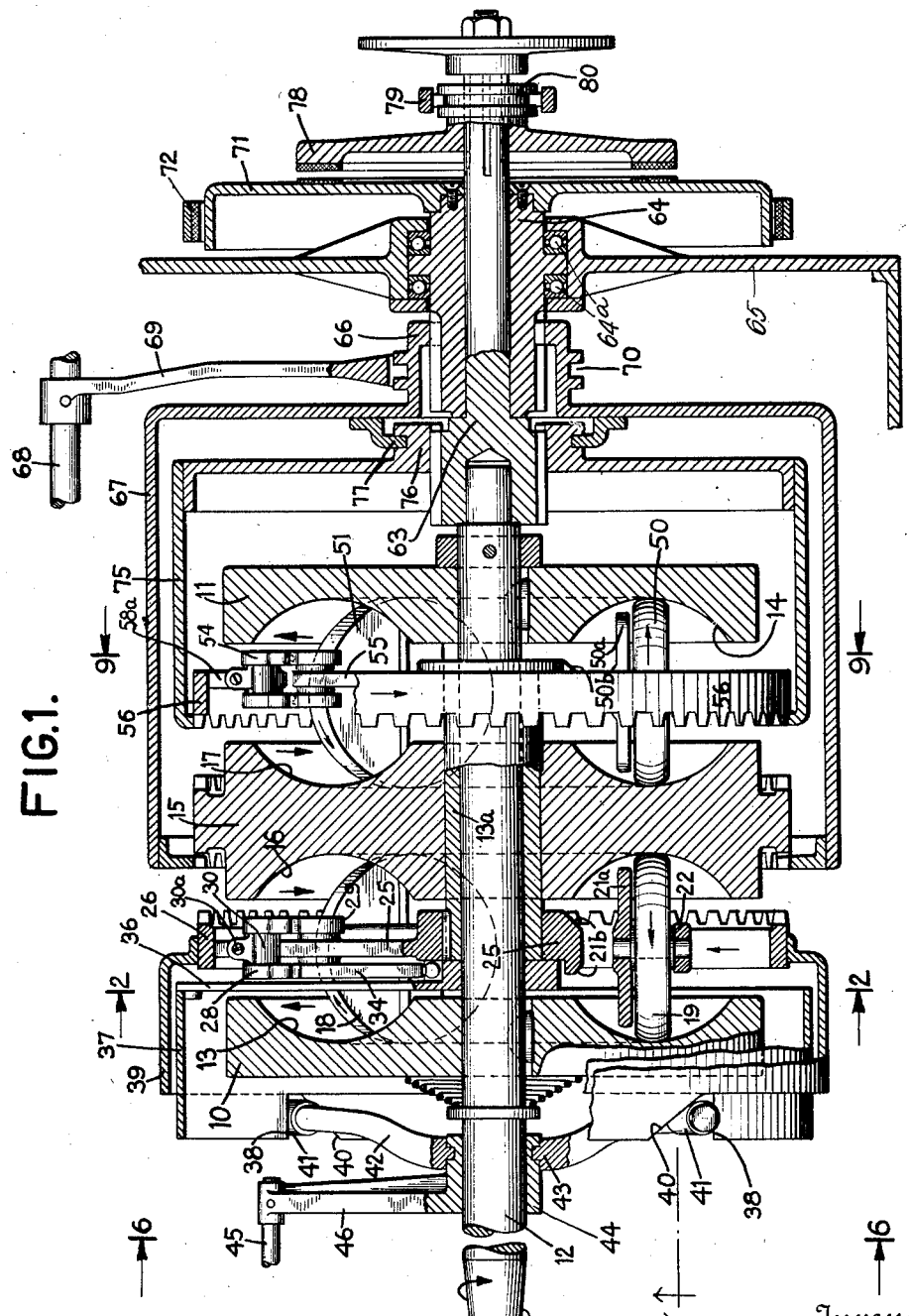

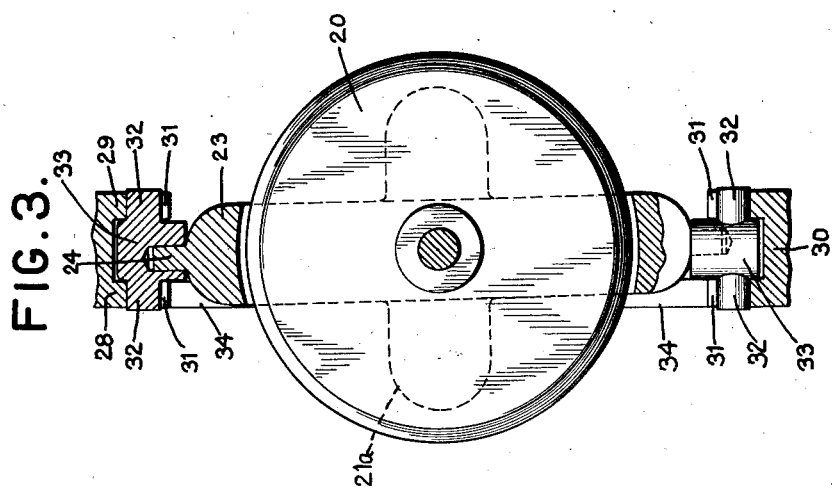
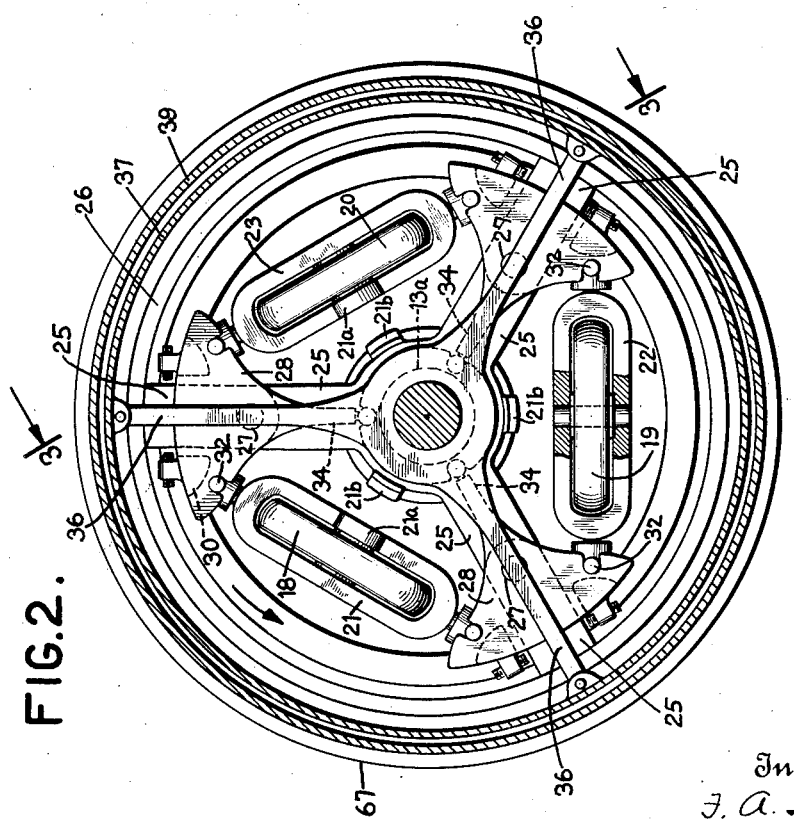

VARIABLE SPEED TRANSMISSION MECHANISM

Original Filed May 7, 1929  11 Sheets-Sheet 3

Inventor
F. A. Hayes
Attorneys
Cooper, Kerr & Dunham

June 28, 1932.  F. A. HAYES  1,865,102
VARIABLE SPEED TRANSMISSION MECHANISM
Original Filed May 7, 1929   11 Sheets-Sheet 4
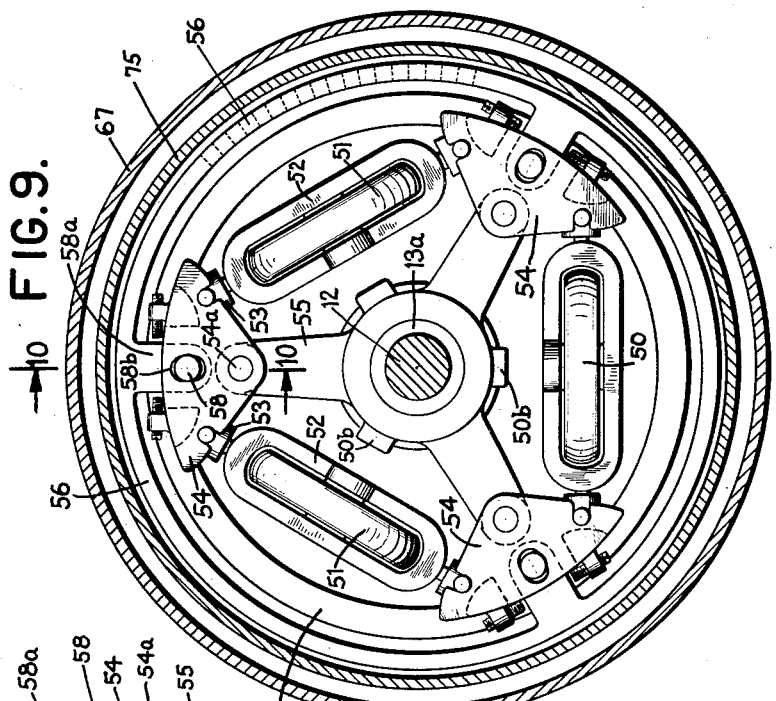
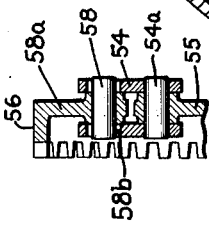
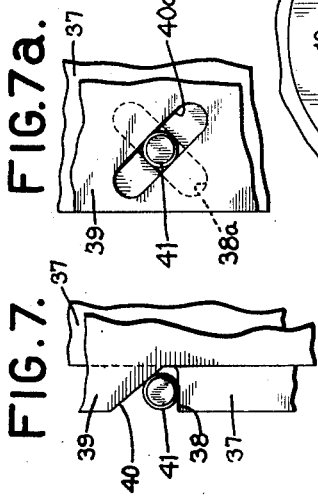
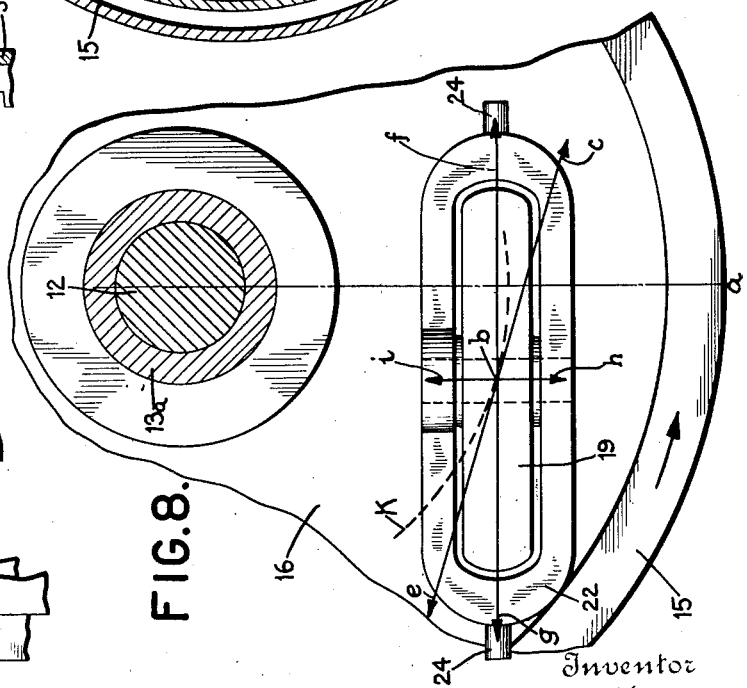
Inventor
F. A. Hayes
By his Attorneys
Cooper, Kerr & Dunham

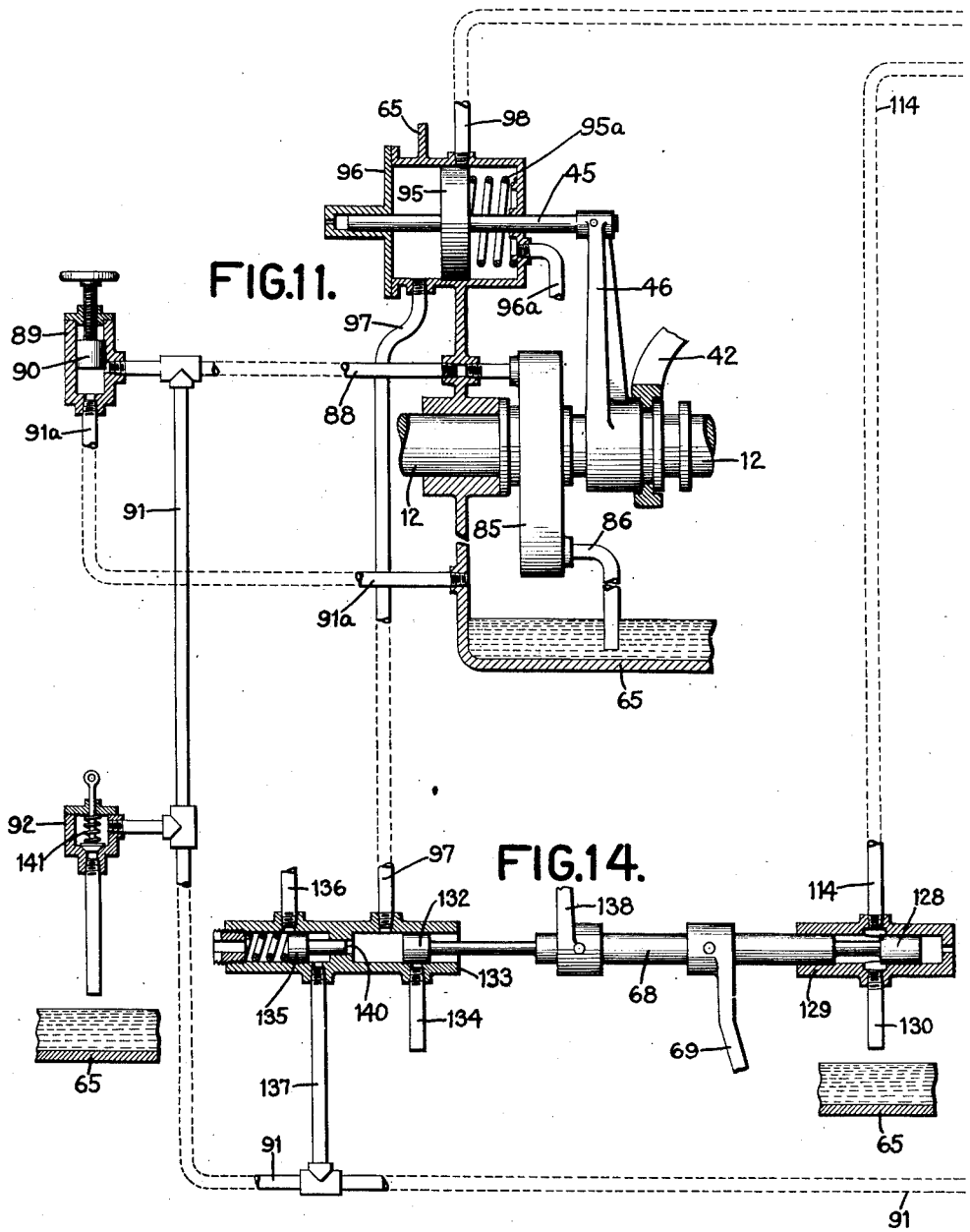

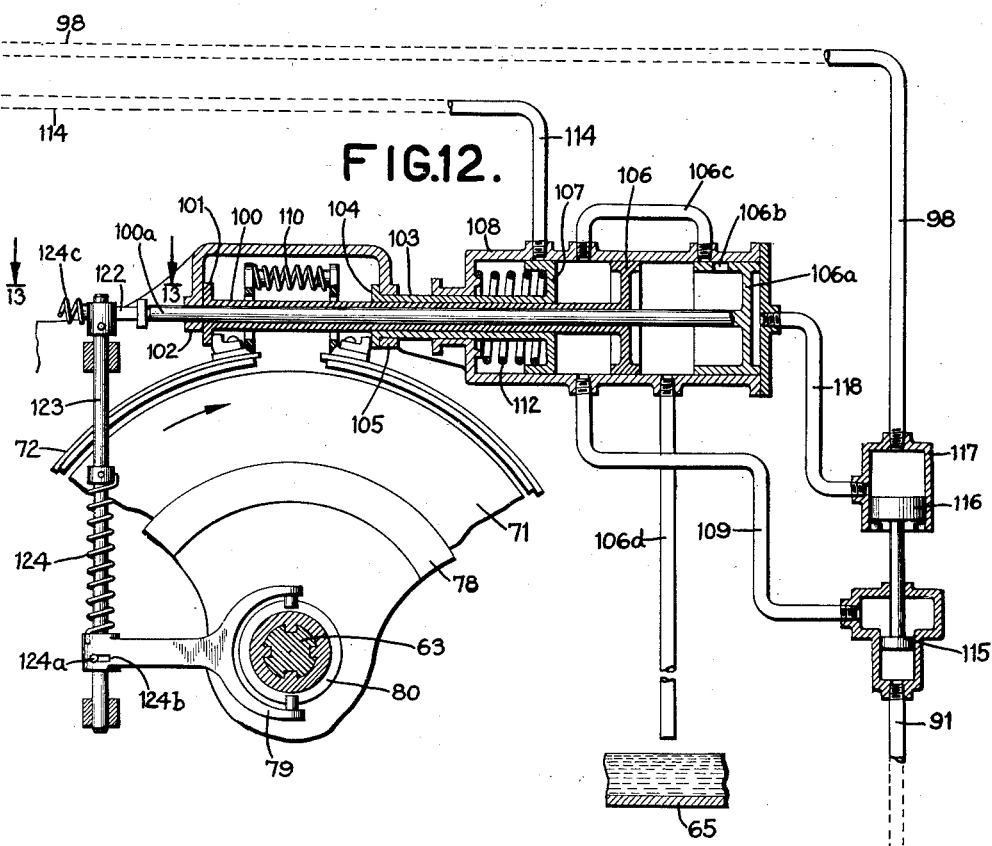
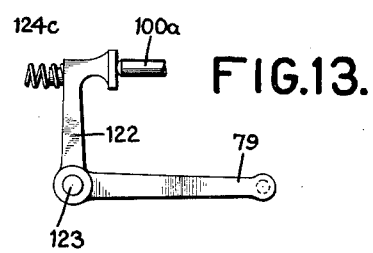

June 28, 1932.  F. A. HAYES  1,865,102
VARIABLE SPEED TRANSMISSION MECHANISM
Original Filed May 7, 1929   11 Sheets-Sheet 7

Inventor
F. A. Hayes
By his Attorneys
Cooper, Kerr & Dunham

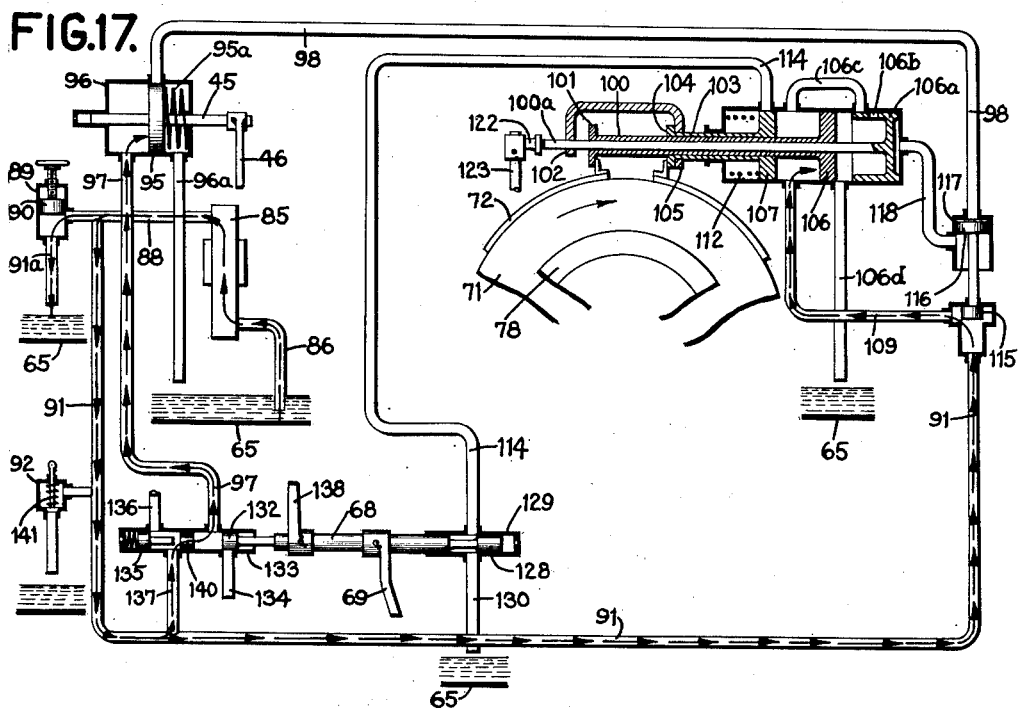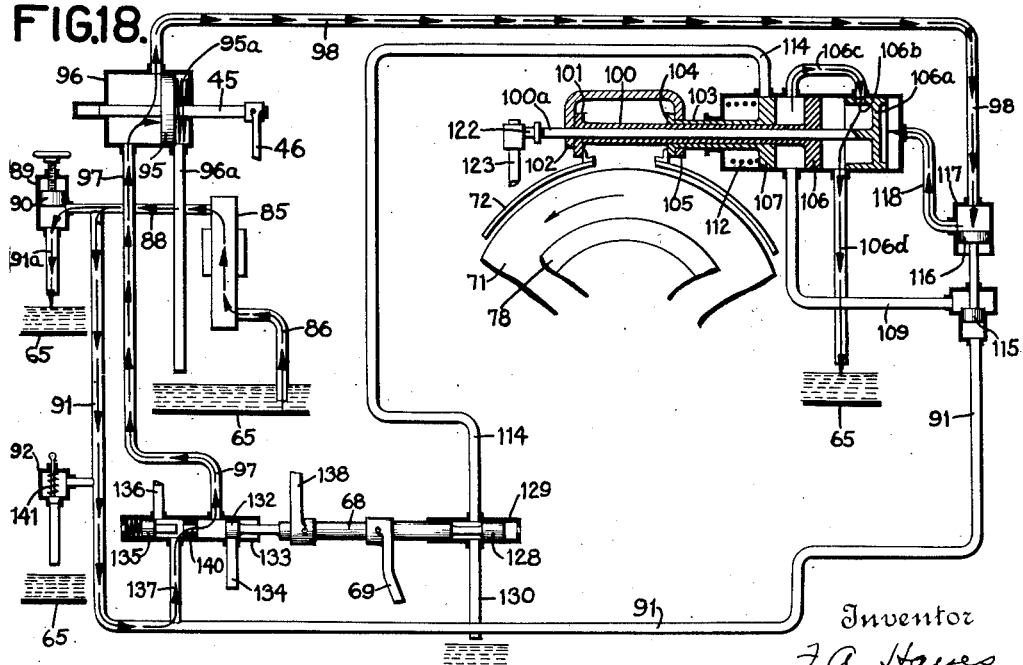

June 28, 1932.  F. A. HAYES  1,865,102
VARIABLE SPEED TRANSMISSION MECHANISM
Original Filed May 7, 1929    11 Sheets-Sheet 9
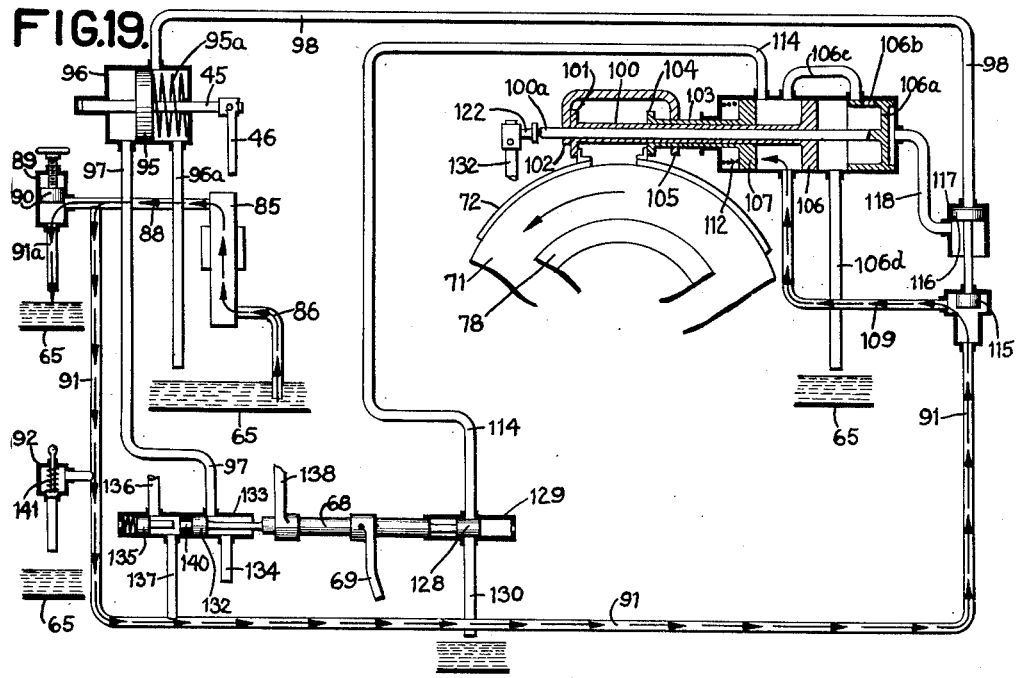
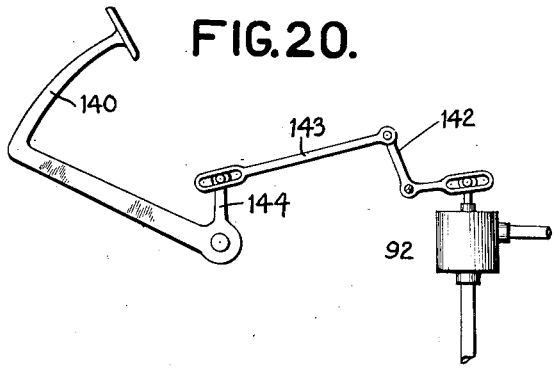
Inventor
F. A. Hayes
By his Attorneys
Cooper, Kerr & Dunham June 28, 1932.  F. A. HAYES  1,865,102
VARIABLE SPEED TRANSMISSION MECHANISM
Original Filed May 7, 1929  11 Sheets-Sheet 10
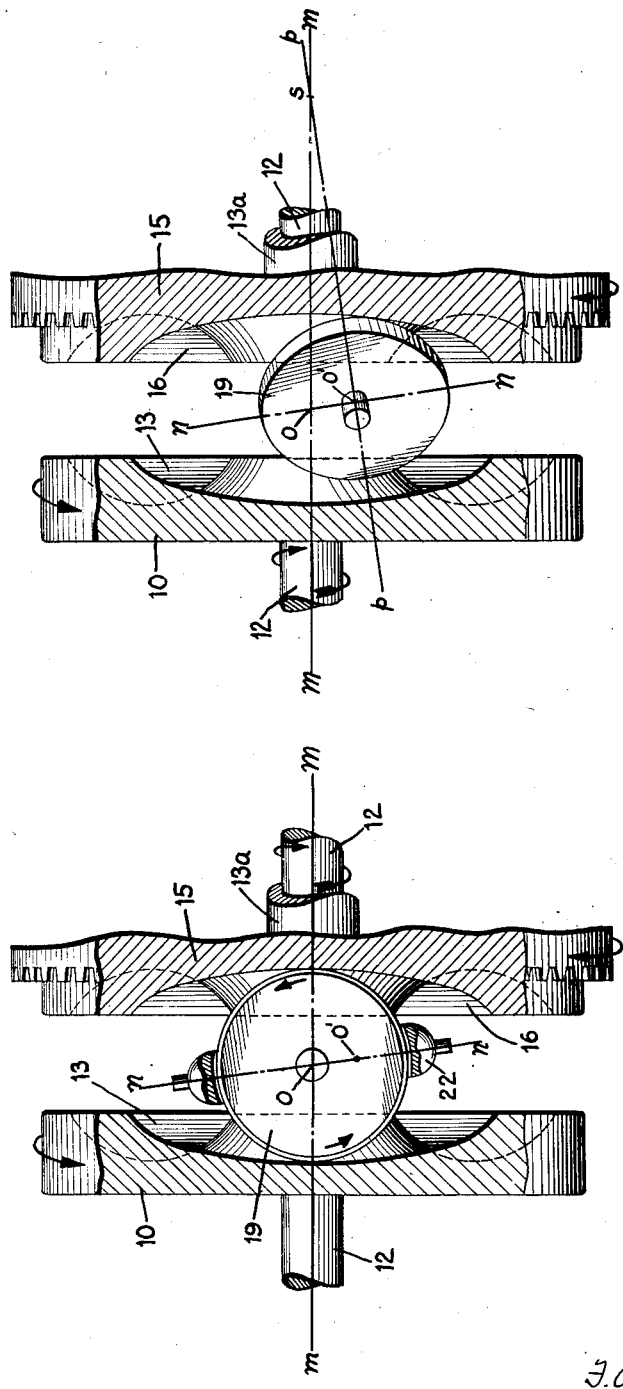

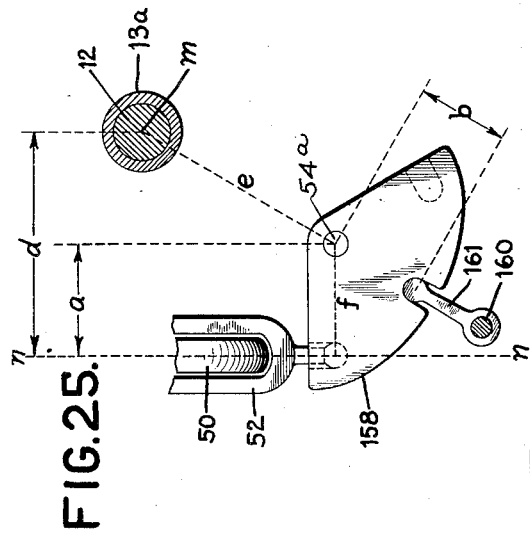
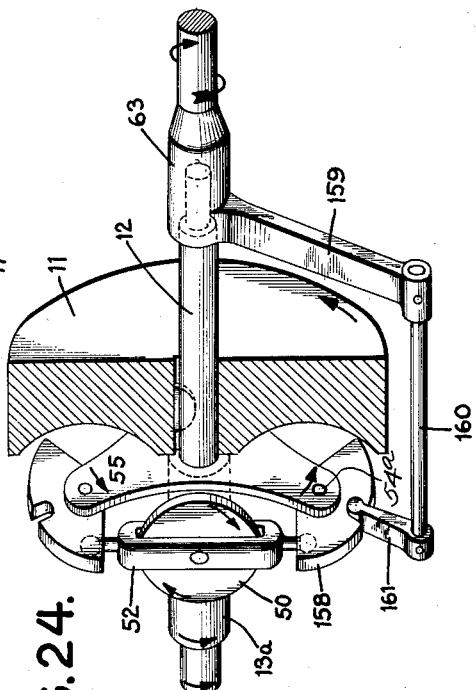
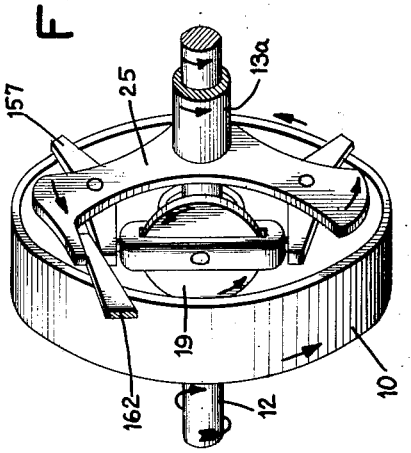
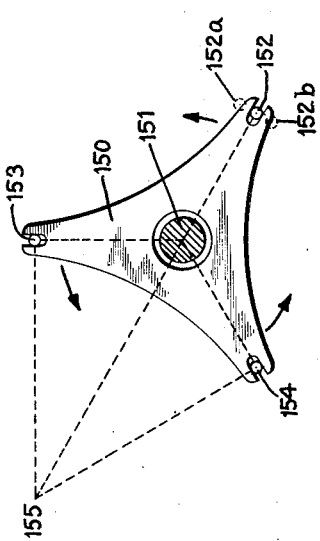

Patented June 28, 1932

1,865,102

UNITED STATES PATENT OFFICE

FRANK A. HAYES, OF MIDDLETOWN, NEW JERSEY

VARIABLE SPEED TRANSMISSION MECHANISM

Application filed May 7, 1929, Serial No. 361,031. Renewed May 4, 1932.

This invention relates to variable speed power-transmission mechanisms of the type in which power is transmitted to a driven shaft or element through the medium of friction disks and interposed friction wheels or rollers. More particularly the invention in its preferred embodiment relates to mechanisms of the class in which the disks are provided with toroidal grooves, i. e., annular grooves of circular cross-section, in their opposite faces, with the interposed friction wheels or rollers working in the grooves. Preferably, also, a plurality of sets of friction rollers are employed, mounted in supports which are rotatable about the disk axis so that the rollers can revolve in planetary fashion around the said axis. One object of the invention is to provide improved means for causing the frictional forces, exerted on the rollers, to rock the same on axes perpendicular to their axes of rotation for varying the speed ratio of the mechanism. For convenience this rocking movement may be termed "precession", as in my prior Patent No. 1,698,229, issued January 8, 1929. Another object is to provide improved means for obtaining "direct drive", that is, a speed ratio of 1:1 between the driving shaft and the driven shaft. A further object is to provide improved means by which the speed of the prime mover, connected with the driving shaft of the transmission mechanism, controls the speed changes of the mechanism, so that speed changes can be brought about merely by varying the speed of the prime mover. Still another object is to provide a transmission mechanism and controlling devices therefor, such that in use in an automobile all the driver has to do is to open the engine throttle when he desires to start the car, and close the throttle and apply the brakes when he desires to stop, the transmission mechanism automatically setting itself to an advantageous speed ratio for any given throttle opening and road condition. To these and other ends the invention comprises the novel features and combinations hereinafter described.

The various features of my invention can be embodied in a mechanism of relatively simple character, and the principle of operation of the preferred embodiment is likewise simple when once understood, but such principle is more readily explained in connection with a concrete embodiment and accordingly reference is now made to the accompanying drawings, illustrating a preferred form of the invention designed for use in an automobile between the motor and the driving wheels.

In the drawings,

Fig. 1 is a longitudinal central section of the mechanism, on a vertical plane. In the apparatus here illustrated three coaxial disks are employed and two sets of planetary rollers. The two outer or end disks are keyed to the driving shaft (which is coaxial with the driven shaft) and the supports for the two sets of rollers are rigidly connected together so that the two sets must revolve at the same angular speed. The "drive" can then be taken from either set, preferably the one next to the driven shaft. For the sake of clearness this Figure omits certain parts which are shown in other figures.

Fig. 2 is a cross section taken about on line 2—2 of Fig. 1, showing the mounting of the set of rollers (conveniently termed the first set) at the power-input end of the mechanism.

Fig. 3 is a detail sectional view, on a larger scale, taken about on line 3—3 of Fig. 2, showing one of the roller carriers in which the rollers are mounted and the trunnion blocks in which the carriers are journaled to permit the carriers (and with them the rollers) to rock or "precess" on axes at an angle to the axes on which the rollers rotate. This figure also illustrates a convenient way of mounting the roller carrier with its axis of precession inclined to the plane in which the roller revolves in planetary fashion around the axis of the disks.

Fig. 7 is a detail view, looking in the direction of the arrow in Fig. 6, showing the cam rings and actuating arm or roller provided to shift one ring relatively to the other.

Fig. 7a is similar to Fig. 7 but showing a modification by which the rings can be shifted positively relative to each other in either direction.

Fig. 8 is a diagrammatic cross section, on the same plane as Fig. 2, illustrating the "precession" of the rollers when the carriers are shifted along their axes of precession.

Fig. 9 is a cross section on line 9—9 of Fig. 1, showing the mounting of the second set of planetary rollers.

Fig. 10 is a detail section on line 10—10 of Fig. 9.

Figure 4:
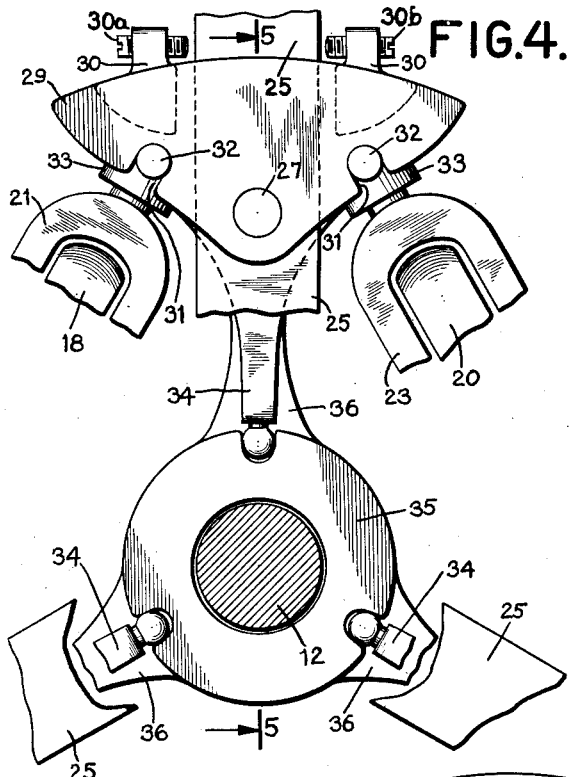
Fig. 4 is a detail view, looking from the rear of Fig. 2, of one of the rockers in which the trunnion blocks for the roller carriers are mounted.

Figs. 11, 12, 13 and 14 illustrate the hydraulic control devices by which the speed changes are brought about, including direct drive. These devices may for convenience be carried by the casing which houses the transmission mechanism proper but for the sake of clearness they are shown detached therefrom and arranged in one plane. The piping by which the various parts are connected is shown in dotted lines from figure to figure.

Figs. 15, 16, 17, 18 and 19 illustrate various stages in operation of the control devices shown in Figs. 11 to 15 inclusive.

Fig. 20 is a detail view showing a connection between the brake pedal of an automobile and a certain valve in the hydraulic control mechanism, arranged so that when the foot-actuated brakes are applied to a predetermined extent the transmission will assume the idling position.

Figs. 21 and 22 are detail sectional views, on line 21 of Fig. 1, illustrating the inclination of the axes of precession of the transmission rollers.

Fig. 23 is a diagrammatic view illustrating the equalizing principle whereby the load on a set of rollers may be distributed equally among the rollers.

Fig. 24 is a perspective view illustrating the equalizing principle whereby the load on two sets of rollers may be divided equally between the sets.

Fig. 25 is a cross section (looking toward the right) on a plane immediately to the left of the roller carrier 52 and rocker 158 of Fig. 24.

Referring to the drawings, the driving disks 10, 11, keyed on the driving shaft 12, which latter is adapted for direct connection with a power shaft, are provided on their inner faces with toroidal grooves 13, 14, that is, annular grooves of circular cross section, and between the two disks is a sleeve 13a rotatable on the shaft. The middle disk 15 is rotatable on the sleeve and is provided on its two faces with toroidal grooves 16, 17 of the same radius of curvature as grooves 13, 14. Between disks 10 and 15 are three transmission rollers 18, 19, 20, forming the first set of rollers, spaced 120° apart between centers, as in Fig. 2. Assuming that shaft 12 and disk 10 are rotating in the direction of the arrow on the shaft in Fig. 1 and that disk 15 is rotatable on sleeve 13a, it will be seen that disk 15 will be rotated in the counterclockwise direction as viewed from the left. The rollers are mounted to rotate in carriers 21, 22, 23, which are provided at their ends with journals, as 24, Figs. 1, 3 and 8, on which they can rock in suitable bearings as hereinafter described.

Referring now to Fig. 8, $a$ represents a plane containing the disk axis and normally containing the axis of rotation of the roller 19, the two axes being therefore co-planar. Remembering that disk 10 (Fig. 1) is between the observer and the figure and that disks 10 and 15 are coaxial, it will be seen that with the roller axis co-planar with the axis of the disks the frictional forces acting on the roller are perpendicular to the plane $a$ and have no effect upon the roller except to rotate it in a fixed position. But suppose the roller is shifted to the position shown in the figure. The instantaneous velocity of the point of contact of disk 15 on the roller (at the far end of the diameter $b$ of the roller) can now be represented in direction, though not necessarily in magnitude, by the arrow $c$, tangent to the circle $k$ concentric with the disk. Similarly, the arrow $e$ represents the instantaneous direction of the velocity of the point of contact between disk 10 and the roller. That is, the two points of contact are at the instant moving in the directions $c$ and $e$ relative to the axis of the disks. Resolving $c$ into two components $f$ and $h$ at right angles to each other, one perpendicular to plane $a$ and the other parallel thereto, and resolving $e$ into similar components $g$ and $i$, it will be seen that components $g$ and $f$ are the velocities of the points of contact around the axis of rotation of the roller, and that components $h$ and $i$ are the velocities of the points of contact around the axis of the carrier; which means that as the roller rotates in its carrier it also rocks on the carrier axis. Hence if the roller is shifted from its normal position, in which its axis intersects (i. e., is co-planar with) the disk axis, the frictional forces acting upon the roller will at once cause the roller and carrier to rock or "precess" on the carrier axis. If the disks are rotating in the directions previously stated, disk 10 clockwise and disk 15 counterclockwise as seen from the left of Fig. 1, displacement of the roller to the left of the plane $a$ (Fig. 8) will cause the roller to rock or precess clockwise as seen in Fig. 1, and displacement to the right of the plane will cause counterclockwise precession. In the first case the speed ratio between disks 15 and 10 will be decreased, causing the first-mentioned disk to rotate more slowly, and in the second case the ratio will be increased. Upon reflection it will be seen that the precessional or rocking movement of the roller and carrier will also occur if disk 15 is stationary and the rollers are revolving in planetary fashion around the disk axis. In short, the precession and consequent change of speed ratio result from relative motion of the disk and rollers about the axis of the former. Manifestly, all the rollers of the set should be shifted correspondingly. For example, if roller 19, Fig. 2, is shifted leftwardly, that is, in the clockwise direction with respect to the axis of the disks, rollers 18 and 20 should also be shifted clockwise, in order that all may take the same speed-ratio position.

Suitable mounting of the roller carriers 21, 22, 23, to permit planetary motion thereof and the shifting of the carriers transversely of the roller axes to cause precession and consequent change of speed ratio as described above, is illustrated in Figs. 2, 3, 4 and 5. Keyed on the rotatable sleeve 13a (see Fig. 1) is a spider consisting of three arms 25 spaced 120° apart, and a ring or annulus 26 attached to the arms after assembling the rockers and carriers. Pivoted at 27 on each arm is a rocker composed of a front plate 28 and a rear plate 29, connected by webs 30 and spaced to straddle the spider arm as clearly shown in Figs. 4 and 5. In the side edges of the rockers are recesses 31, to receive the journals or trunnions 32 of the trunnion-blocks 33, in which the journals 24 of the roller carriers are inserted. The roller carriers are thus supported in the plane of the spider and between the arms thereof. The front rocker-plates 28 are provided with fingers 34 extending radially inward and equipped with ball ends engaging recesses in a ring 35 loosely encircling shaft 12. If, now, ring 35 is given a slight rotary movement, say clockwise as viewed in Fig. 2, the fingers 34 will be rocked counterclockwise, thereby tilting the rockers 28—29 on their pivots 27 and thus shifting the roller carriers in the counterclockwise direction, with consequent precession of the roller carriers in their trunnion blocks 33.

Figure 5:
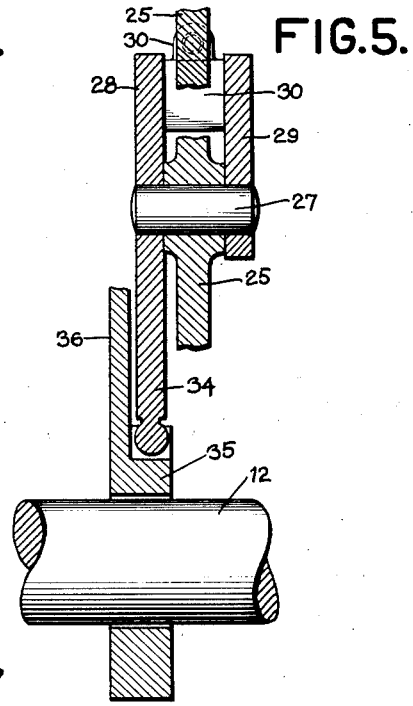
Fig. 5 is a section on line 5—5 of Fig. 4.
Figure 6:
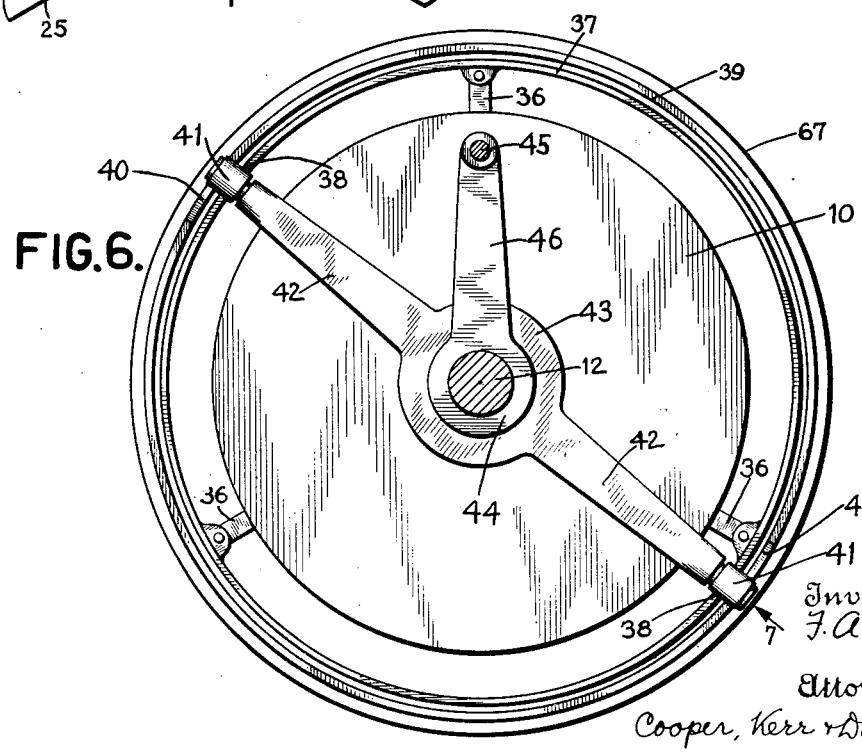
Fig. 6 is a cross sectional end view on line 6—6 of Fig. 1, showing the mechanism for tilting the rockers in which the roller carriers are mounted, for the purpose of shifting the carriers in line with their axes of "precession" to cause the rollers to "precess" and thereby vary the speed ratio of the transmission mechanism.

To produce the slight rotation of ring 35 as described above, the ring is provided with three radial arms 36, Figs. 2 and 5, extending outwardly into connection with a drum-shaped annulus or ring 37 which, as shown in Fig. 1, extends leftwardly beyond disk 10 and is provided with cam edges 38. On the ring 26, carried by the spider arms 25, is a similar annulus or drum 39, encircling annulus 37 and provided with inclined cam-edges 40 crossing the straight cam-edges 38 of the other. Cooperating with the cam edges are two rollers 41, carried by arms 42 (see also Figs. 6 and 7) extending radially from a ring 43 rotatable but non-slidable on a hub 44 which can be shifted axially on shaft 12 but without rotating. Hence when hub 44 is shifted toward the right in Fig. 1 the drum 37 will be rotated clockwise relatively to the drum 39, or, what amounts to the same thing, drum 39 is rotated in the counterclockwise direction. If the hub 44 is shifted leftwardly the drum 37 is permitted to rotate counterclockwise, as will be readily understood. In this way the ring 35, Fig. 4, is given the slight rotary movement desired to produce precession of the rollers and consequent change of speed ratio as described above. The hub 44 is shifted at will in either direction by a shift rod 45 attached to an arm 46 on the hub. It will be observed that the arms 42 (or, in general, the "control") can shift the carriers only in the direction which produces change to a higher speed ratio; because they can exert a cam action only in that direction. Change "down", that is, to a lower speed ratio, is then produced by the frictional resistance opposing transmission of power, and to produce such change "down" it is only necessary to decrease the force preventing outward movement of the arm 46. If it is desired to make the change to lower ratio positive the drums or rings may be provided with crossed slots for the rollers 41, as in Fig. 7a for example, in which the slots are marked 38a, 40a.

The second set of three planetary rollers, two of which are shown at 50, 51, Fig. 1, are mounted in carriers 52, Fig. 9, journaled in trunnion blocks 53 mounted in rockers 54 straddling the arms 55 of a three-armed spider which is fixed on the rightward or rear end of the sleeve 13. These rockers are similar to the corresponding rockers shown in Fig. 2, and are pivoted at 54a on the arms 55, but the rockers 54 lack the radial fingers 34 of rockers 28 and the spider has no rim or ring corresponding to ring 26 which connects the arms of the other spider. Instead, around the spider 55 is a floating ring 56 having ears 58a extending inwardly between the front and rear plates of the rockers and provided with pins 58 working in radial slots 58b in the rocker plates, as indicated in Fig. 10. It will now be seen that relative movement of rotation between the spider arms 55, on which the rockers 54 are pivoted, and the floating ring 56 on which the fingers 58a are mounted, will cause the rockers to tilt, thereby shifting the roller carriers and causing precession of the rollers as described above in connection with the first set of rollers. The necessary relative rotation of the ring and spider, to cause shifting of the rollers and precession thereof in harmony with the rollers of the first set follows automatically the shifting of the rollers of the first set, as will be explained hereinafter. Since the first set is the one which is adjusted at will to control or vary the speed ratio of the mechanism it may be conveniently referred to as the "control set".

Referring again to Fig. 1, the driving shaft 12 is shown journaled in the end of the coaxial driven shaft 63, which rotates in a collar or sleeve 64 rotatable in a thrust bearing 64a in the rear wall of the transmission housing or casing 65. Splined on this sleeve is the hub 66 of a drum 67 which extends forwardly (leftwardly) and is provided with teeth cooperating in the manner of a jaw clutch with similar teeth on the middle disk 15. The drum may be shifted axially into and out of engagement with the disk by a shift or control rod 68 attached to the arm 69 of a fork engaging hub 66 in a groove 70. Fixed on sleeve 64, outside of the housing 65, is a brake drum 71 encircled by a brake band 72 which may be tightened on the drum, by manual means (not shown) but preferably by means actuated by fluid pressure as hereinafter described, to arrest the disk 15 and prevent rotation thereof.

Assuming that brake band 72 (Fig. 1) is released and disk 15 therefore free to rotate, and that the friction rollers are connected to the driven shaft 63, it will be seen that rotation of the driving disks 10, 11 in the direction of the arrow on driving shaft 12 will cause the middle disk, 15, to rotate in the opposite direction. If now the brake band 72 is tightened on brake drum 71 the rotating disk 15 will slow down and the planetary rollers will begin to revolve, thereby starting the load. As the brake band is tightened further the middle disk is brought to rest, and the planetary rollers then drive the load at the "speed" to which the rollers have been set by the precession already described.

The necessary connection between the driven shaft 63 and the planetary rollers is provided by a drum 75, Fig. 1, having clutch teeth adapted to engage similar teeth on the forward (left) edge of the floating ring 56. This drum is carried by a hub 76 splined on the driven shaft so that it may be shifted axially thereon to engage the teeth on the ring 56, or similar teeth on disk 15, or take an intermediate "neutral" position. The hub 76 is connected to drum 67 by a circular rib or flange 77 on the latter, engaging the hub in a circumferential groove therein. The two drums 67, 75 are thus shifted simultaneously by the shift rod 68 but can rotate independently of each other.

Splined on the outer end of the driven shaft 63 is a brake or clutch disk 78, which may be shifted into and out of engagement with brake drum 71 by a fork 79 cooperating with a groove 80 in the hub of the disk. It will be seen that when this clutch is engaged with the drum 71 and the brake band 72 is released to permit drum 71 and disk 15 to rotate, the driven shaft 63 is coupled to sleeve 64 on which drum 67 is splined. The latter being clutched (by its clutch teeth) to disk 15, and drum 75, splined on the driven shaft 63, being similarly clutched to the ring 56, the driven shaft is connected both to the planetary rollers and to the middle disk 15. The roller carriers therefore cannot shift on the disk 15 except to the slight extent permitted by the pivotal movement of the rockers in which they are mounted. Hence, in the absence of slippage between the driving disks 10, 11 and the rollers, the three disks and the interposed rollers must revolve as a unit at the same speed as the driving disks and driving shaft, and with them the driven shaft 63. This gives "direct drive". The slight permissible shift of the carriers, referred to above, is important for the reason that it permits the automatic change out of direct drive described hereinafter.

As so far described the rotation of the driven shaft 63 is in the same direction as that of the driving shaft 12. In order to obtain "reverse" (the driven shaft being at rest and the rollers therefore in the lowest speed ratio position) it is only necessary to shift drums 67 and 75 leftwardly, thereby bringing the clutch teeth on drum 67 into engagement with teeth on ring 26 (carried by the spider in which the first or control set of planetary rollers is mounted) and bringing the teeth on drum 75 into engagement with similar teeth on disk 15. Then upon applying brake band 72 as before, the rollers will be prevented from revolving around the disk axis and hence disk 15, now coupled to the driven shaft, will be rotated in the direction opposite to that of the driving shaft 12.

Reverting to Figs. 1, 2 and 8, and the precessional operation of the transmission rollers as explained in connection with the latter figure, it will, upon reflection, be seen that the load reaction tends constantly to displace the rollers in a direction which will cause precession to a lower speed ratio. This tendency is opposed by the force exerted on the roller carriers in the opposite direction through the rollers 41, arms 42, arm 46, etc., in Figs. 1 and 6. If this force just equals the load reaction no displacement of the rollers will occur and hence no change of speed ratio. If the operator makes the force greater than the torque reaction the rollers will be displaced in the direction necessary for change to a higher ratio. If it is made less, or if the torque reaction becomes greater for any reason, the rollers will be displaced automatically in the direction causing precession to a lower speed ratio.

For actuating the various controls I prefer to use fluid pressure devices. Hydraulic devices, using oil as the pressure liquid, are especially convenient, as the oil required for lubrication of the mechanism can be utilized for the purpose, suitable pressure being obtained by a pump actuated by the transmission mechanism or the engine or other prime mover which drives the mechanism. I also prefer, especially when the mechanism is used in an automobile between the engine and the driving wheels of the car, to make the operation of the control devices dependent upon the pressure of the oil and to make the oil pressure in turn dependent upon the speed of the engine. Then so far as the driver of the car is concerned all he needs to do to start the car (assuming the engine idling) is to open the throttle slightly. Thereafter, varying the throttle opening will automatically bring about the proper changes of speed ratio, while to stop the car he merely closes the throttle to idling speed and applies the brakes. Putting the transmission mechanism in reverse is then the only operation that does not follow automatically upon appropriate change of throttle opening. Control mechanism having the operation described is illustrated in Figs. 11, 12, 13, 14 and 15, to which reference is now made.

Referring to Fig. 11, oil under the necessary pressure is supplied by a pump 85, which may be of the gear type, having an intake pipe 86 leading from the oil sump in the transmission housing or case 65, and having a delivery pipe 88 connected to a valve 89 which may be located at any convenient point inside or outside the housing, but the handle by which the valve is set should, in general, be accessible, though as will be seen later the valve does not require manipulation as a control, being merely set to suit the idling speed of the engine, the character of the oil used, etc. The oil pump, preferably driven directly from the driving shaft 12, is mounted in any convenient position, as for example at the forward end of the driving shaft 12 inside the housing. In the present embodiment of the invention the pump is driven at a speed directly proportional to the engine speed, so that the higher the engine speed the greater will be the pressure delivered. Oil from the pump is delivered to other parts of the control mechanism by a pipe 91, shown at the left of Figs. 11 and 14 and at the lower right of Fig. 12.

The valve 89, Fig. 11, has a plug 90 to regulate the inflow of oil from pipe 88 by varying the opening of the port to which the pipe is connected. In practice the valve is so set that when the engine is running at a predetermined speed slightly above idling the port will pass enough oil to keep the oil pressure down to a point too low to actuate any of the control devices, the excess oil escaping through pipe 91a to the sump. When, however, the engine speed is increased, by opening the throttle, the port will not accommodate the additional oil thus pumped, with the result that the pressure builds up in pipe 91 to a value sufficient to actuate the control mechanism. Connected to pipe 91 is a valve 92, the purpose and function of which will be explained hereinafter.

The arm 46 (Figs. 1 and 11) which actuates the mechanism by which the transmission rollers are displaced to cause precession and consequent change of speed ratio, is connected by the rod 45 to a piston 95 (urged leftwardly by spring 95a) in a cylinder 96 to which oil under pressure is supplied by a pipe 97. The piston also controls communication between the cylinder and a pipe 98 connected to one side thereof. The cylinder may be carried by the front end of the case or housing 65, as indicated in Fig. 11.

The brake band 72, Figs. 1 and 12, by which the middle disk 15 is arrested as described above, is tightened by hollow piston rods 100, 103, having collars 101, 104, cooperating with lugs on the band and also serving to limit the leftward and rightward movements of the rods in the fixed guide-stops 102, 105. The two rods are connected to two axially spaced pistons 106, 107, in a cylinder 108, to which oil under pressure may be admitted at a point between the pistons by a pipe 109. The band is released by an expansion spring 110, between lugs on the ends of the band. Between piston 107 and the adjacent cylinder head is a spring 112. Piston 107 also controls the cylinder port to which pipe 114 is connected. Delivery of oil to the cylinder through pipe 109 is controlled by a valve 115, itself controlled by a piston 116 in a cylinder 117, connected to pipe 98, and connected by pipe 118 to the rear end of the brake cylinder 108. It will be seen that in the absence of countervailing pressure in valve cylinder 117, oil under pressure in pipe 91 will open valve 115 and pass thence through pipe 109 to the brake cylinder 108.

The fork 79 which actuates the direct drive clutch 78, Figs. 1, 12 and 14, is itself actuated to engage the clutch with the drum 71 by the advance (leftward movement) of a piston rod 100a acting through the arm 122 fixed on a rock shaft 123 to which the fork 79 is connected by a coil spring 124 and a pin 124a extending from the shaft into a slot 124b in the hub of the fork. The spring is under tension so that the left end of the slot is held firmly against the pin. Then after the clutch member is applied to the drum and the fork can therefore move no farther, the arm 122 and shaft 123 can nevertheless continue to move as the rod 100a advances farther toward the right. To release the clutch as the piston rod moves rightwardly a spring 124c, Fig. 13, may be provided. The rod 100a extends through the hollow rod 100 and is actuated by a piston 106a, provided with a port 106b controlling the by-pass 106c by which at appropriate times oil trapped between pistons 106 and 107 can be discharged through pipe 106d to the sump 65.

The shift rod 68, Figs. 1 and 14, by which the drums 67 and 75 are shifted into neutral, reverse or forward drive, actuates at its rear end a valve plug 128 working in a casing 129 to control communication between a relief pipe 130 and pipe 114, shown also in Fig. 12. At its forward end the shift rod 68 actuates a valve plug 132 in casing 133 to control communication between a relief port or pipe 134 and pipe 97. In the forward end of the valve casing is a spring-pressed valve plug 135, controlling communication between the two halves of the casing and between a relief pipe 136 and a pipe 137 connected to pipe 91, Fig. 11. The reverse shift rod 68 is shifted manually through any suitable mechanism, represented by the arm 138 fixed on the rod.

The operation of the hydraulic control devices shown in Figs. 11, 12, 13, 14, is illustrated in Figs. 15 to 19, inclusive, to which reference is now made. In these figures the direction of oil flow or effective pressure is indicated by the small arrows.

Figure 15:
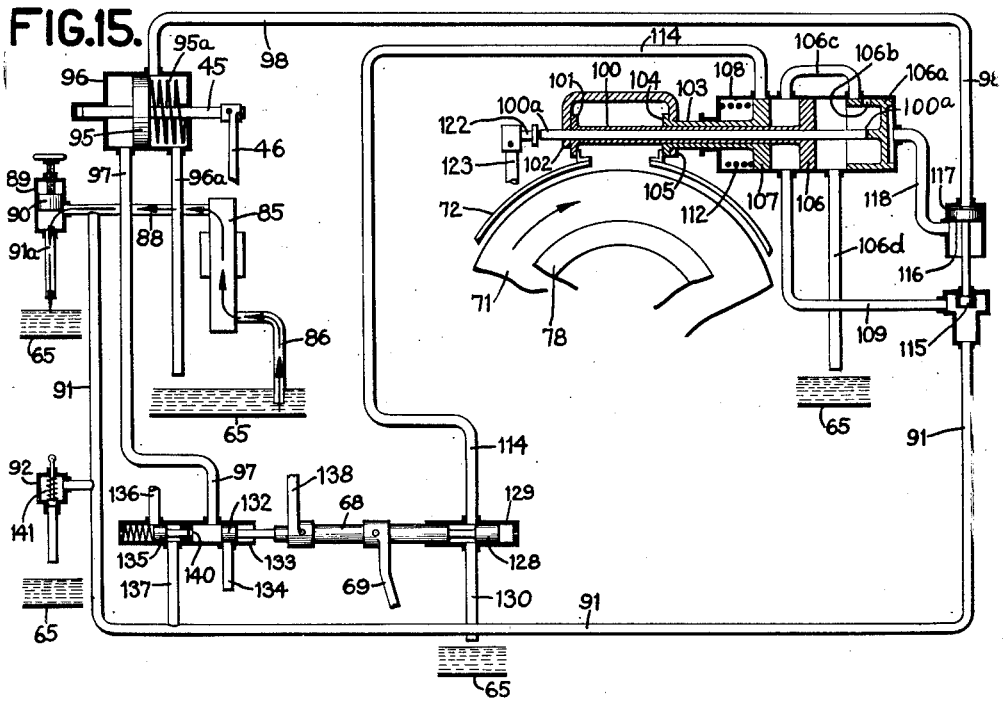
Figure 16:
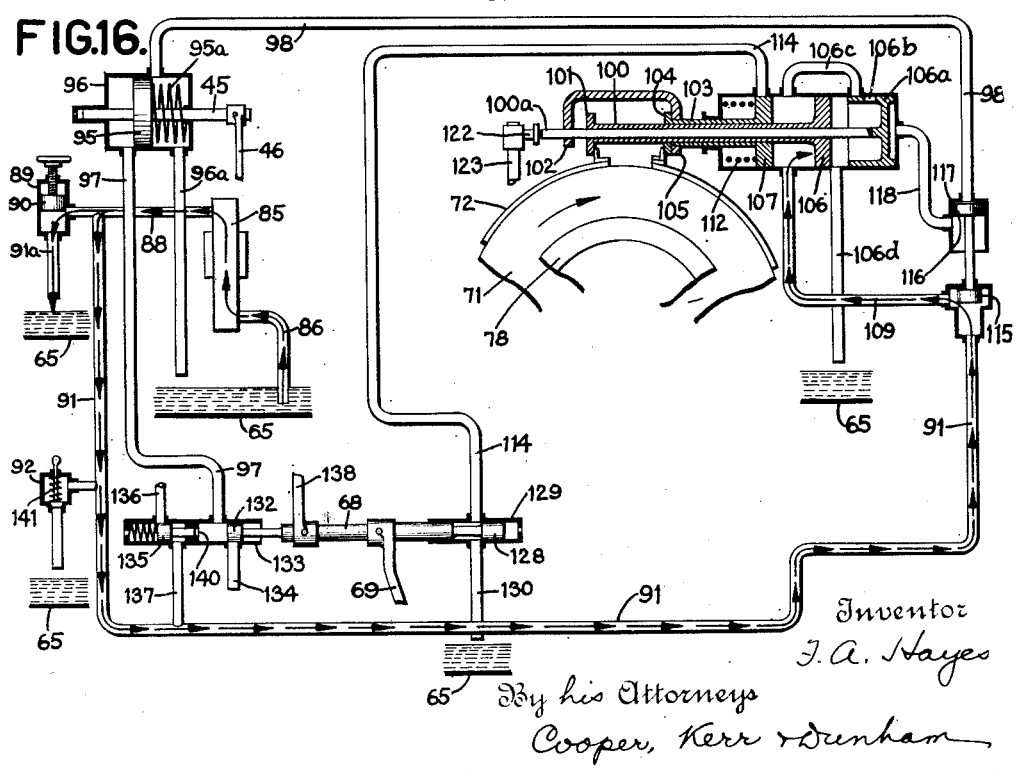

With the car standing still and engine idling the control devices are in the relative positions shown in Fig. 15. The pump 85 is passing oil under low pressure from sump 65 through pipes 86, 88, valve 89 and pipe 91a back to the sump. Valve 89 is so adjusted that enough of the oil pumped will thus be passed back to the sump to prevent sufficient pressure being applied to valve 135 and brake cylinder 108 to open the valve or actuate the brake mechanism. To start the car the driver speeds up the engine, thereby pumping more oil than valve 89 can pass. Oil under pressure through pipe 91 then passes valve 115 and passes through pipe 109 to cylinder 108, tending to move pistons 106, 107 apart but spring 112 prevents piston 107 from moving and hence only 106 moves. Its movements applies the brake band 72 to drum 71, gradually stopping the middle disk, which starts the car. The transmission mechanism, however, remains in the lowest speed position. As soon as the band takes hold the action of the drum thereon (in the direction of the arrow) aids spring 112 and the collar 104 is therefore held positively against the stop 105. Piston 106 therefore does all the work of applying the brake. The condition at this stage is illustrated in Fig. 16.

It will be seen that the brake shown is "self-energizing" in both directions, that is, as soon as the band begins to take hold the drum itself, through its friction on the band, tends to wrap the band more tightly, thus making it possible to use a smaller brake cylinder and to use the pistons as valves.

As long as the piston 106 is free to move in the brake cylinder 108, the latter cylinder acts as an expansion tank and the oil pressure in the system is limited by the relation between the force exerted by the spring 112 and the area of the piston, and hence the pressure exerted on valve 135 by oil in pipe 91 is insufficient to open port 140, but after the brake band 72 is tight the pressure builds up rapidly and valve 135 is forced leftwardly, thus admitting oil through pipe 97 to the speed-control cylinder 96, where the pressure on piston 95 is resisted by its spring and also by the torque reaction of the load exerted through the rollers and their carriers, and arm 46 and piston rod 45. When, however, the pressure produced by the increasing speed of the engine is sufficient to overcome this resistance the piston is advanced (toward the right) thereby actuating arm 46 and increasing the speed ratio of the transmission mechanism. This causes acceleration (of the car), which is kept up to the maximum ability of the engine, through the balance of the oil pressure on one side of the piston and the spring tension and load reaction on the other. Thus the car accelerates rapidly. The condition at this state, at a high speed-ratio position of the transmission rollers, is illustrated in Fig. 17.

As the car is started (with the rollers in a low speed position) the load reaction opposing advance of the piston 95 is, in general, high, and considerable oil pressure must be built up, by speeding up the engine, in order to cause precession of the rollers to a higher speed position. But as the engine speeds up and the car velocity increases, the load reaction decreases, and in such case the piston might shoot ahead to the limit of its stroke, except for the effect of the spring 95a. As the load reaction decreases, the piston is still opposed by the spring; and as the piston advances the resulting compression of the spring increases its tension. Hence, as the load reaction decreases, the spring offers increasing resistance to the movement of the piston, thereby preventing the sudden advance that might otherwise occur, and the mechanism is thus made stable in operation.

As the increasing oil pressure in cylinder 96 advances piston 95 toward the right the piston eventually reaches a predetermined high speed position at which it uncovers pipe 98, through which oil under pressure then flows to the direct-drive valve or control cylinder 117, causing piston 116 to descend and valve 115 to close pipe 91. Then oil passes from pipe 98 through valve cylinder 117 and pipe 118 to brake cylinder 108, moving piston 106a and its rod 100a leftward and thus rocking shaft 123, which applies the direct-drive clutch 78. Meanwhile the load reaction on drum 71 is clockwise, but as the clutch 78 takes hold it first overcomes this reaction and then begins to turn the drum counterclockwise. The force thus exerted on the band 72 carries the latter in the same direction, moving pistons 106, 107 leftwardly, uncovering pipe 114 thus permitting escape of oil trapped between the pistons until the oil pressure between the pistons just balances the rightward pressure of spring 112. Piston 106a then moves farther to the left (such movement being permitted by spring 124, Fig. 12) and brings port 106b into register with the adjacent orifice of the by-pass 106c, whereupon spring 110 (Fig. 12) moves piston 106 leftwardly (the oil trapped between pistons 106 and 107 escaping through the by-pass 106c and pipe 106d to sump 65) thus entirely releasing the brake band 72. The condition at this stage is illustrated in Fig. 18. It will be seen, however, that piston 95 remains in its rightward position, with the transmission rollers in the high speed position. It will also be observed that in the change to direct drive the drum 71 is at no time free and at no time can it revolve clockwise. In effect the drum and its brake band and the clutch 78 form a one-way clutch, permitting the drum to rotate only in the counterclockwise direction. There is thus no possibility of the motor racing, as might happen if the drum were free at any time.

In "direct drive" the load reaction is still carried through the transmission rollers and hence tends to force piston 95 (in speed control cylinder 96) leftwardly against the pressure of the oil. When an overload occurs or the throttle opening is decreased by the driver, the resulting slowing down of the engine may reduce the oil pressure to a value at which it is insufficient to overcome the tension of spring 95a and the existing reaction of the load, whereupon piston 95 moves back (i. e., toward the left in Fig. 18), first closing pipe 98 and then opening it to pipe 96a, thus permitting oil to escape to the sump from pipe 98. Piston 116 then rises above the orifice of pipe 118 and opens pipe 109 at valve 115. Piston 106a then begins to move to the right (with escape of oil from behind it through pipe 118 and valve cylinder 117), gradually closing by-pass 106c at port 106b. At the same time, oil from pipe 109 enters cylinder 108 between the pistons 107, 106, moving piston 106 toward the right as by-pass 106c is closed. This movement of the piston applies band 72 to the drum 71 as the continued rightward movement of piston 106a releases clutch member 78, thus restoring the mechanism to high speed ratio position. If oil is admitted by pipe 109 before piston 106a releases clutch 78, piston 106 will be moved rightwardly until the band 72 engages the drum 71, whereupon the drum, turning counterclockwise, carries the band and pistons 107, 106 leftwardly until pipe 114 is uncovered. Oil between the pistons then escapes through pipe 114, valve 129 and pipe 130 to the sump. The band is then held lightly engaged with the drum by spring 112, the drum slipping under the band until clutch 78 is released by piston 106a whereupon the drum starts to turn clockwise (due to the torque reaction), and, ceasing to exert any leftward pull on the pistons, permits the latter to be moved rightwardly by spring 112 and the friction of the drum on the band. This rightward movement closes pipe 114, so that full pressure from pipe 109 is developed between the pistons and the band is immediately tightened on the drum as already described. It will be observed that in the shift out of direct drive the drum 71 is never free and hence cannot rotate clockwise. It will also be seen that piston 95, in control cylinder 96, will continue to move leftwardly, with further decrease of speed ratio, until the balance between oil pressure in the cylinder, and torque reaction and spring tension, is again restored; the balance being restored either by speeding up of the engine, or by the automatic decrease of speed ratio, or both. And of course the speed ratio will be automatically increased as soon as the oil pressure for any reason again exceeds the combined torque reaction and spring tension.

It is not, in general, desirable to have the mechanism go out of direct drive at the same car velocity as that at which it went in, since "hunting" may result, the mechanism going in and out with slight variation of car velocity above and below the critical value. In the construction illustrated this is prevented by making the control piston 95, Fig. 11, of substantial thickness relative to the orifice of pipe 98, as indicated in the figure. Assuming that in the figure the piston is advancing (moving rightwardly) from a position at which the pipe is just closed, it must move a distance greater than its own thickness before the pipe is opened to produce direct drive. If then the car velocity immediately decreases, the concurrent recession of the piston first closes the pipe again, but, obviously, the mechanism remains in direct drive until further recession of the piston, through a distance greater than its own thickness, again opens the pipe and thus permits the entrapped fluid to escape. By the time this happens, however, the car velocity will have decreased correspondingly, the difference depending, in general, other conditions being the same, upon the extent of piston movement required, and being greater with a thicker piston or narrower pipe orifice than with a thinner piston or wider pipe orifice.

With the engine idling and car standing still (see Fig. 15) reverse drive is obtained by moving reverse shift-rod 68 to the left. This shifts drums 67 and 75 (Fig. 1), inside the transmission casing, to the reverse positions as already described, and at the same time closes pipe 114 at valve 128 and opens relief port or pipe 134 to pipe 97 at valve 132. Brake drum 71 then rotates in the direction of the arrow, Fig. 19. To start the car the driver speeds up the engine as in starting forward, and oil under pressure is then supplied through pipe 91, valve 115 and pipe 109 to the brake cylinder 108, thereby tightening the brake band 72 and arresting the drum 71 and the middle disk of the transmission mechanism. Since the load reaction on the brake drum is in the direction of the arrow (in Fig. 19), both pistons 106, 107 are moved leftwardly (as soon as the band tightens) until piston 106 can move no farther. The leftward movement of piston 107 opens pipe 114 (at the brake cylinder 108) but the other end of this pipe has been closed by valve 128, and hence no oil escapes from between the pistons through pipe 114. Since pipe 97 is closed to pipe 91 (by valve 132), opening of valve 135 by oil under pressure from pipe 91 does not admit oil to the control cylinder 96 and accordingly the transmission remains in the low speed position no matter how much the engine be speeded up. Conditions in reverse drive are illustrated in Fig. 19.

To resume forward drive after reverse (Fig. 19) the car is first brought to a stop by closing the engine throttle. The resulting decrease of oil pressure permits valves 135 and 115 to close, whereupon pistons 107, 106 move rightwardly to the position shown in Fig. 15. Moving the shift rod 68 back (rightwardly from the position shown in Fig. 19) then restores completely the conditions illustrated in Fig. 15.

There is also provided a brake-valve 92, Fig. 11, connected to the main pressure pipe 91 and discharging into the sump. This valve is held closed (for example by a spring 141) at all times when the vehicle brakes are not in use, but is connected to the brakes in such manner that when the brakes are applied the valve is opened, thus permitting oil in pipe 91 to flow directly to the sump. This relieves the pressure in the entire system, which results in immediate release of the brake band 72 and permits the drum 71 to revolve freely. The mechanism therefore transmits no power to the car when valve 92 is opened far enough to release the brake band 72 or prevent its being applied to stop the drum. The valve may be connected with the brakes in any convenient and suitable manner, and as indicative of the fact I have in Fig. 20 shown the valve connected to the conventional brake pedal 140 by a linkage comprising a bell crank 142, link 143 and arm 144. If the car is on an up-grade the pedal may have to be depressed so far, to keep the car from rolling backward, that the consequent opening of the valve will not permit the necessary oil pressure to be developed to start the car. In such case the hand brake is used to control the car, thus permitting the brake pedal to be released and the valve to be closed.

The engine speed at which the car is started and speed changes occur (up or down) depends in general upon two factors,—the setting of the "speed valve" 90 and the viscosity of the oil used in the control system. With a given valve setting, more thin oil will be passed than will a thicker oil, and vice versa. Similarly, with a given oil, more will be passed with a wide than with a close setting. Hence by adjusting the valve any oil condition can be taken care of, as for example in cold weather when the oil is cold and correspondingly thickened. Also, the valve can be adjusted, while driving, to permit any desired engine speed to be obtained without correspondingly fast change to higher speed ratio. This makes possible a higher car velocity at lower transmission "speeds", which may be useful in congested traffic. For example, by opening the engine throttle by means of the usual hand lever on the steering column and then manipulating the speed valve a high engine speed and a high car velocity can be obtained without going into direct drive, which latter corresponds to the "high speed" position of the conventional sliding gear transmission. Nevertheless if the speed valve is not opened so far as to keep the transmission in the lowest speed position, the mechanism will always change down automatically whenever the load reaction exceeds the power delivered by the mechanism. By making the contact pressures between the disks and rollers heavy enough to transmit the maximum power of the engine at the lowest speed ratio no slippage between the disks and rollers can occur. Before that can happen the engine will stall. There is thus no danger of damage due to the wear that would be caused by slippage.

To stop the car it is only necessary to close the throttle and apply the brakes, whereupon the brake band 72 is released and the middle disk of the transmission therefore is permitted to revolve freely, so that the transmission ceases to drive the car.

According to one important feature of the invention the axes of the roller-carriers, on which the rollers "precess" to alter the speed ratio of the mechanism, are inclined or oblique to the planes in which the disks rotate. Such inclination of the carrier axes is indicated, with much exaggeration, in Figs. 21 and 22. In these figures, which are sectional views on a plane indicated by the line 21 of Fig. 1, the driving disk 10 and driving shaft 12 are rotating in the same direction, as indicated by the arrows, while the middle disk 15 is rotating in the opposite direction, as indicated by its arrow. The axis of the disks and driving shaft is represented by the line $m$—$m$; and line $n$—$n$, the axis of the carrier 22, is oblique or inclined to the planes of the disks. It will be observed, however, that in Fig. 21 the axis of the roller, perpendicular to the plane of the figure through the point $o$, intersects the disk axis and hence the roller is in equilibrium position; that is, the components $h$, $i$, of Fig. 8 are both zero and therefore the roller does not precess. Suppose the roller is displaced by shifting the carrier downward in Fig. 21 (away from the observer in Fig. 1 and to the left in Fig. 2) thus bringing the roller axis to the point $o'$. Now the roller axis does not intersect the disk axis and accordingly the roller begins to precess toward a lower speed ratio position. As it does so the roller axis, at all times perpendicular to the axis of precession $n$—$n$, swings up toward the disk axis and, eventually, again intersects the disk axis as indicated in Fig. 22, in which the roller axis, represented by line $p$—$p$, intersects $m$—$m$ at the point $s$. The roller is then in equilibrium position again and precession therefore ceases. It is important to observe that the angular rocking movement of the roller, i. e., the precession, necessary to bring the roller axis $p$—$p$ into intersection with the disk axis $m$—$m$ is in general proportional to the distance $o$—$o'$; or, stated otherwise, the greater the displacement of the roller produced by shifting its carrier, the greater the precession, and conversely, the less the displacement the less the precession. In short, the inclination of the axes of precession causes the precession to overtake the displacement, so to speak. The rapidity with which the precessing rollers overtake the displacement depend in general upon the relative angular speeds of the disks with which they cooperate, and at disk speeds comparable to those produced when the mechanism is used in automobiles the speed of the precessional movement is so high that the precession is virtually simultaneous with the displacement which causes it. The desired inclination of the carrier axis may be obtained by canting the journals 24 in the trunnion blocks 33, as indicated in Fig. 3. It will be observed that the return of the roller to the equilibrium position does not involve return of the carrier-shifting means to an initial or normal position. For example, if the speed-control piston 95, Fig. 11, is advanced to cause change of speed-ratio to a higher value the piston remains in its advanced position when the precessing rollers reach their equilibrium positions. In other words, in their speed-varying adjustment the rollers follow the control device and to every speed-ratio position of the rollers there corresponds a definite position of the control device, as for example the piston 95. Inclining the precession axes thus coordinates the position of the control means with the speed-ratio position of the rollers. Accordingly the piston may serve as a valve to control the fluid pressure (through pipe 98, valve 117 and pipe 118) to cylinder 108 for the purpose of shifting to direct drive at an appropriate speed ratio. This is a highly important advantage of inclining the axes of precession, as it greatly simplifies the control mechanism. Another important advantage is explained hereinafter.

Two advantageous features remain to be described. One is the equalization of the load between or among the rollers of a set and the other is the equalization of the load between or among the sets. The first insures that each roller will do its full share of the work and the second that each set will do its full share. For such purpose it is important that the control of speed-ratio change be torque-responsive, that is, that the resistance to speed change of one roller relative to another shall be directly proportional to the load or torque being transmitted, or shall vary as some direct function thereof.

An important advantage of equalization is automatic compensation for inaccuracies of manufacture. If it were possible or practicable to produce perfect alignment and spacing of the parts a rigid connection between the driven shaft or member and the driving devices might give equal distribution of load, but since this is difficult if not virtually impossible, the equalizing means insures proper distribution of load regardless of inaccuracies of manufacture within the usual tolerances. This has a highly advantageous effect upon the capacity (size and life) of the transmission mechanism, since if one roller takes more than its share of the load the pressures between disks and rollers must be based upon that roller, with resulting decrease of capacity. Thus, in a set having two rollers, if one roller takes twice as much of the load as the other the latter will do only half as much work and the consequent reduction of capacity will be twenty-five per cent, or of that order. A further advantage in the two-set or "duplex" form of the invention is that it is possible to apply speed-change control to one set only, thus greatly simplifying the apparatus.

In the case of three rollers, arranged equiangularly around a common center and subjected to a load which is a torque or turning effort, the equalizer may take the form of a floating ring or spider with three points of support. This is shown somewhat diagrammatically in Fig. 23, in which the equalizer 150, in the form of a three-armed spider, is permitted to have a slight floating movement about a shaft 151 and is subjected to a torque as indicated by the arrows. This torque is resisted by three pins 152, 153, 154, embraced by the recesses in the ends of the equalizer arms. Suppose that due to inaccuracy in manufacture or for some other reason one of the pins, say 152, is displaced to the position indicated at 152$a$, or 152$b$. In such case the equalizer can by a rotary shifting movement about an external instantaneous center, as 155, adjust itself to the positions of the pins, thus distributing the load with substantial equality during and after the displacement of pin 152. Evidently the same equalization is obtained if the spider is fixed with respect to the shaft and the pins are carried by a floating member. Suppose now that each of the three pins of Fig. 23 is responsive to the bodily displacement of one of the three rollers 18, 19, 20, Fig. 2. As shown in my United States Patent No. 1,698,229, if the roller is allowed to move in the direction of the force which it is exerting on the equalizer 150, it will precess to a lower speed ratio and thus exert less force on the equalizer for any given load conditions, whereas if it is caused to move in the opposite direction, i. e., against the force it is exerting on the equalizer, it will precess in the opposite direction or toward higher ratio, and will thus exert more force. Referring again to Fig. 23, suppose now that in the centralized position of the spider 150 the corresponding position of the roller to which pin 152 is responsive is such that it tends to precess toward a higher speed ratio relative to the rollers to which pins 153 and 154 are responsive. Pin 152 will therefore be exerting a greater load on spider 150 than will the other two pins; and since the spider is free to "float", the roller will move the spider in the direction of this force, that is, toward the position indicated at 152a, whereupon, as previously stated, the force exerted by pin 152 will decrease. From inspection of the figure it will be clear that such rectilinear movement of the spider will cause pins 153 and 154 to each move in directions opposite to the directions of the forces which they are exerting on the spider and hence will cause these forces to increase until the forces on all three pins are equal. Similarly, if none of the three pins exerts the same force on the spider, it will be seen that the spider, by a rectilinear movement along some radial line, can equalize the loads on the three pins, and if the spider is free to float, such movement will therefore take place. Evidently the effect is the same whether the spider is connected directly to the roller carriers or the connection is made through levers or rockers. Upon reference to Figs. 2 and 4 it will be seen that the construction there shown utilizes the principle illustrated in Fig. 23. In the first named figures the rockers 28 and rollers 18, 19, 20 are subjected to the torque of disk 10 and to the torque reaction of the load on driven shaft 63. The rockers are rocked by the floating equalizer ring 35 to which the rocker arms 34 are loosely connected. This equalizer ring is connected to the drum 37, Fig. 1, by means of the arms 36, which are in fixed connection with the hub 35, which latter is free to move transversely in all directions by reason of the clearance between the same and shaft 12, as clearly shown in Figs. 4 and 5. Evidently, movement of the hub and drum in a direction parallel with the control arms 42, Fig. 6, can take place freely, the drum simply sliding on the rollers 41, but upon reflection it will be seen that in general a tendency of the drum to move in other directions will result in more or less tilting of the drum on the rollers 41 as pivots, the hub 35 moving freely on the ball-ends of arms 34, Fig. 5. This tilting movement is in part a transverse movement of the hub, due to the fact that the axis of the tilt, that is, the axis of the rollers 41 on the control arms 42, is spaced axially (toward the left in Fig. 1) from the hub. It will also be observed that the equalizing movement of the hub 35, arms 36, and drum 37 in which the parts take a more or less eccentric position with respect to the shaft 12, does not require any relative rotation of any of the three parts, and that they may in fact be held against relative rotational movement by the control arms 42.

In like manner the rollers 50, 51 of the second set, Figs. 1 and 9, are mounted to float on the spider 55 and are connected to the equilizer ring 56 by pins 58 working in radial slots in the rockers 54 in which the carriers are journaled, these pins being fixed on ears 58a extending radially inward from the ring in the plane of the spider arms. The ring can then adjust itself in the same way as the member 150 in Fig. 23, that is, by a slight radial movement in one direction or another relative to the axis of the disks.

In explanation of the equalization between sets of rollers reference is made to Fig. 24, which shows the two driving disks 10, 11, fixed on shaft 12, spiders 25, 55 fixed on the hollow shaft 13a, and rollers 19, 50 and carriers therefor. Simplified rockers 157, 158 are shown, and in lieu of the drum 75 and ring 56 of Fig. 1 the driven shaft 63 is connected to rocker 158 by an arm 159, pin 160 and finger 161. For simplicity the control mechanism for producing change of speed ratio is omitted, as are also the middle disk and the means for preventing rotation thereof. In place of the speed changing mechanism and the equalizing means for the first set of rollers a wedge 162 is shown, holding the first set at a fixed speed ratio position. Since the two spiders are rigidly connected by shaft 13a constituting a member which carries the torque between the two sets of rollers, they must rotate at the same speed. Also, since the speed ratio between the two disks with which roller 50 cooperates (disk 11, and the middle disk, not shown) is determined by the position of roller 19, and since roller 50 is free to float with respect to its spider 55, i. e. to shift its axis above or below the disk axis, with resulting precession, roller 50 must set itself at the same speed-ratio angle as roller 19.

Assume now that driven shaft 63 encounters resistance. This will be communicated by arm 159, pin 160 and finger 161 to rocker 158, and will tend to rock the rocker 158 and so put an upward force on the roller carrier. If this force moves the carrier upward, the axis of the roller will be brought above the disk axis (that is, out of intersection therewith) and the rightward edge of the roller, in contact with disk 11, will move outwardly in a spiral path on the disk. But this will cause the roller to revolve about the disk axis at a faster rate than before, which will immediately lower the roller to neutral position. Should the roller move below the neutral position the reverse action takes place and the roller again returns to neutral position. Since the slightest displacement in either direction produces the result described it will be readily seen that no displacement will in fact occur. The roller is therefore stable with respect to the reaction of the rocker and will maintain its position or angle to the disk axis regardless of the load imposed, unless, indeed, the load is great enough to overcome the adhesion between roller and disk and thus cause slippage. Referring to Fig. 25, it will be seen that if radius $b$ is less than radius $a$ finger 161 will not only put a downward reaction on roller 50 (Fig. 24) but will also put a tangential reaction on spider 55, which will be communicated by shaft 13$a$ and spider 25 to roller 19. Hence if radius $b$ (Fig. 25) is properly chosen with respect to $a$ and $d$ the load will be equally divided between the two sets of rollers. Moreover, if there are two or more equally spaced rollers and the two or more pins 160 and fingers 161 are allowed to float the load will be equalized not only between the two sets of rollers but also between or among the rollers of the second set. The desired float of the equalizer can be provided in any convenient and suitable manner, but I prefer the simple method illustrated in Fig. 9, in which the equalizer (ring 56) is connected to the carriers by the pins 58 and slots 58$a$.

Referring to Fig. 1, when the car is coasting with brake band 72 released the relative rotation of disks 10—11 and 15 is the reverse of the directions indicated by the arrows. In that case disk 15 runs at a higher angular speed than disks 10—11, and hence the rollers would tend to run off the disks. To prevent this from occurring the roller carriers are provided with arms 21$a$, 50$a$, arranged to engage stops 21$b$, 50$b$ on the sleeve 13. I also provide adjustable stops 30$a$, 30$b$, on the rockers 28, Fig. 4, and similar stops 54$b$, 54$c$, Fig. 9, are provided to cooperate with the ears 58, to prevent the rockers being moved too far by the control devices should the latter devices otherwise permit of such excessive movement. Such stops to prevent excessive rocking toward the low speed position are in general necessary on the driving set of rollers (that is, rollers 50, 51 in the mechanism illustrated) to insure the second set taking its share of the load when the mechanism is "in reverse", since in reverse the aqualizing mean is not effective. Stops to prevent excessive rocking toward the high speed position are also necessary, in general, on the second set.

In various prior friction transmission mechanisms, the axes of precession of the transmission rollers are parallel to the planes of the disks and the rollers are caused to precess not by shifting the rollers transversely of their axes of rotation but by tilting the axes of precession in their own plane. This method requires that as or when the rollers reach the desired new speed-ratio position the precession axes must be restored to a normal position in order to stop the precession. In such a system the slightest tilt of the precession axes causes continued precession until the axes are restored to the normal position, and hence there is not, to every speed-ratio position of the rollers, a corresponding position of the control device in which it remains after change of speed ratio. But if the precession axes are inclined to the disk planes (as in my invention) then for each speed ratio position of the rollers there will be a definite position of the means for tilting the axes to produce precession. The inclining of the axes thus coordinates the position of the control means with the speed-ratio position of the rollers.

Reverting to Fig. 25, it is in some cases desirable to have the radius $f$ and the axis of precession $n$ $n$ at right angles to each other, as giving a more nearly rectilinear movement of the roller carriers when the rockers are rocked to displace the carriers and thereby cause precession. With such angular relation the means for producing precession of the rollers have the maximum response to the load, and, consequently, there is maximum resistance, at the roller carriers, to the precession-producing movement of the rollers necessary to cause precessional change to a given higher speed ratio. If the rocker pivot is located farther from the disk axis, making the angle between $n$ $n$ and $f$ (on the upper side of $f$) greater than 90°, the load-response and resistance mentioned are decreased and vanish when the pivot is at the intersection of radius $e$ and the axis of precession, $n$—$n$. It is thus possible, by location of the rocker pivot, to provide any desired degree of response to the load reaction. At the point of intersection just referred to there is minimum displacement of the roller carrier (along or in parallelism with the axis of precession) when the rockers are rocked, but instead the precession-producing movement mentioned above is a tilting movement of the carriers, as in the prior constructions referred to above, and of course at intermediate positions the precession-producing movement is partly displacement and partly tilting, and therefore the energy required under given conditions to produce a given extent of precession is correspondingly decreased. Nevertheless, if the carrier axes, i. e. the axes of precession, are inclined as in my invention the advantageous coordination of control-position and speed-ratio position is still obtained. I do not claim herein the mounting of the rockers in such manner as to produce substantial tilting movement of the rollers when the rockers swing on their pivots, but I do so in my copending application Serial No. 590,360, filed February 2, 1932.

It is to be understood that the invention is not limited to the specific construction herein described but can be embodied in other forms without departure from its spirit as defined by the appended claims.

I claim:—

1. In a variable speed transmission mechanism, in combination, a rotatable driving element, friction disks coaxial with said element and having toroidal grooves in their opposed faces, one of said disks being rotatable relatively to the driving element, friction rollers cooperating with said grooves and mounted for precession to vary the speed ratio of the mechanism, a rotable driven element coaxial with the disks and driving element, means for driving the driven element through said disks and rollers at speeds less than unity ratio, and means to couple the relatively rotatable disk and the driven element for direct drive at unity ratio.

2. In a variable speed transmission mechanism, in combination, a rotatable driving element, friction disks coaxial with said element and having toroidal grooves in their opposed faces, one of said disks being rotatable relatively to the driving element, friction rollers cooperating with said grooves and mounted for precession to vary the speed ratio of the mechanism, a rotatable driven element coaxial with the disks and driving element, means for driving the driven element through said disks and rollers at speeds less than unity ratio, and automatic means operating to couple the relatively rotatable disk and the driven element for direct drive at unity ratio when the rollers precess to a predetermined speed ratio position.

3. In a variable speed transmission mechanism, in combination, a driving shaft, friction disks coaxial with the driving shaft and having toroidal grooves in their opposed faces, one of said disks being rotatable relatively to said shaft, planetary friction rollers cooperating with said grooves and mounted for adjustment to vary the speed ratio of the mechanism, a driven shaft coaxial with the disks and driving shaft, means operable at will to prevent rotation of said relatively rotatable disk, means normally connecting the planetary rollers with the driven shaft to drive the latter at variable speed, and automatic means operable when the rollers are in a predetermined position of speed ratio adjustment to connect the driven shaft with the relatively rotatable disk.

4. In a variable speed transmission mechanism, in combination, a rotatable driving element, friction disks coaxial with said element and driven thereby, a friction disk rotatable about the axis of said element, said disks having toroidal grooves in their opposed faces, planetary friction rollers cooperating with said grooves and mounted for adjustment to vary the speed ratio of the mechanism, means operable at will to prevent rotation of the second disk, a rotatable driven element coaxial with the disks and driving element, means for operatively connecting the driven element with the planetary rollers, and means for operatively connecting the driven element with the said rotatable disk.

5. In a variable speed transmission mechanism in combination, a rotatable driving element, friction disks coaxial with said element and having toroidal grooves in their opposed faces, one of said disks being rotatable relatively to the driving element, friction rollers cooperating with said grooves and mounted for precession to vary the speed ratio of the mechanism, a rotatable driven element coaxial with the disks and driving element, means for driving the driven element through said disks and rollers at speeds less than unity ratio, and means to couple the relatively rotatable disks and the driven element for direct drive at unity ratio against the load reaction of the driven element, said coupling means operable at a speed ratio less than unity and acting in response to the load reaction of the driven element to uncouple said element and relatively rotatable disk.

6. In a variable speed transmission mechanism, in combination, a rotatable driving element, a friction disk connected with the driving element for rotation thereby, a friction disk coaxial with the first and rotatable relatively thereto, said disks having toroidal grooves in their opposed faces, planetary friction rollers cooperating with the said grooves and adjustable to vary the speed ratio of the mechanism, a driven element, means operatively connecting the driven element with the planetary rollers, a brake drum connected with the said relatively rotatable disk for rotation therewith, braking means associated with the drum, means operable at will for applying the braking means to the drum to prevent rotation of the disk with which the drum is connected, and means operable to connect the driven element with the drum.

7. In a variable speed transmission mechanism, in combination, a rotatable driving element, a friction disk connected with the driving element for rotation thereby, a friction disk coaxial with the first and rotatable relatively thereto, said disks having toroidal grooves in their opposed faces, planetary friction rollers cooperating with the said grooves and shiftable to vary the speed ratio of the mechanism, a driven element, means connecting the driven element with the planetary rollers for rotation thereby, a brake drum connected with the said relatively rotatable disk, a brake band associated with the drum, means for applying the band to the drum to arrest the latter and thereby prevent rotation of the disk with which the drum is connected, and fluid pressure means acting to shift the rollers to a higher speed ratio position as the speed of the driving element increases after the brake drum has been arrested.

8. In a variable speed transmission mechanism, in combination, friction driving disks, a friction disk coaxial with the driving disks between the same and rotatable relatively thereto, said disks having toroidal grooves in their opposed faces, planetary friction rollers arranged in sets between the disks, cooperating with the grooves therein and adjustable to vary the speed ratio of the mechanism, a driven element, and load-equalizing driving means between the driven element and the sets of planetary rollers.

9. In a variable speed transmission mechanism, in combination, a friction driving disk, a friction driven disk coaxial with the first, said disks having toroidal grooves in their opposed faces, planetary friction rollers cooperating with said grooves and mounted for adjustment on axes inclined to their plane of planetary revolution to vary the speed ratio of the mechanism, means operable to prevent rotation of the second disk and releasable to permit such rotation, a rotatable driven element, and means for operatively connecting the driven element with the planetary rollers and the driven disk simultaneously or with the planetary rollers alone, as desired.

10. In a variable speed transmission mechanism, in combination, a friction driving disk, a friction driven disk coaxial with the first, said disks having toroidal grooves in their opposed faces, planetary friction rollers cooperating with said grooves and mounted for adjustment on axes inclined to their plane of planetary revolution to vary the speed ratio of the mechanism, means operable at will to produce such adjustment of the rollers, means operable to prevent rotation of the driven disk and releasable to permit such rotation, a rotatable driven element, automatic means for connecting the driven element with the planetary rollers and driven disk when the said adjustment producing means is in a predetermined position, and means operating in harmony with said automatic means to release said rotation preventing means.

11. In a variable speed transmission mechanism, in combination, a rotatable driving element, friction driving disks connected with the driving element for rotation thereby, an interposed friction disk coaxial with the driving disks between the same and rotatable relatively thereto, said disks having toroidal grooves in their opposed faces, planetary friction rollers arranged in sets between the disks and cooperating with the grooves therein, floating carriers for the rollers, adjustable to vary the speed ratio of the mechanism; rotatable supports for the floating carriers, connected together to cause said sets of planetary rollers to revolve at the same angular speed; a driven element; and means connecting the driven element with the floating carriers of one set for rotation therewith.

12. In a variable speed transmission mechanism, in combination, coaxial friction disks having toroidal grooves in their opposed faces, a rotatable supporting element coaxial with the disks, members pivoted on the rotatable element, roller carriers mounted between the pivoted members to rock on longitudinal axes, friction rollers cooperating with the grooves in the disks and mounted in the carriers to rotate on axes transverse to the longitudinal axes of their carriers, a member rotatable about the axis of the disks and loosely connected with the pivoted members, a driven element, and connecting means between the driven element and the rotary member to drive the former from the latter.

13. In a variable speed transmission mechanism, in combination, coaxial friction disks having toroidal grooves in their opposed faces, a rotatable supporting element coaxial with the disks, members pivoted on the rotatable element, roller carriers mounted between the pivoted members to rock on longitudinal axes, friction rollers cooperating with the grooves in the disks and mounted in the carriers to rotate on axes transverse to the longitudinal axes of their carriers, and a rotatively movable annulus loosely connected with the pivoted members.

14. In a variable speed transmission mechanism, in combination, coaxial friction disks having toroidal grooves in their opposed faces, a rotatable element coaxial with the disks, members pivoted on the rotatable element, roller carriers mounted between the pivoted members to rock on longitudinal axes, friction rollers cooperating with the grooves in the disks and mounted in the carriers to rotate on axes transverse to the longitudinal axes of their carriers, and means for rocking the pivoted members to shift the carriers and rollers transversely of the axes of the latter.

15. In a variable speed transmission mechanism, in combination, coaxial friction disks having toroidal grooves in their opposed faces, a rotatable element coaxial with the disks, members pivoted on the rotatable element, roller carriers mounted between the pivoted members to rock on axes inclined to the plane of rotation of said element, friction rollers cooperating with the grooves in the disks and mounted in the carriers to rotate on axes transverse to the axes of their carriers, and means for rocking the pivoted members to shift the carriers and rollers transversely of the axes of the latter.

16. In a variable speed transmission mechanism, in combination, coaxial friction disks having toroidal grooves in their opposed faces, planetary friction rollers cooperating with said grooves, precessing carriers for the rollers, a rotatable member coaxial with the disks, rockers mounted on said member and supporting the carriers with their axes of precession inclined to the plane of rotation of the member, a driven member actuated by the disks and rollers, and means for rocking the rockers and equalizing on the rollers the load reaction of the driven member.

17. In a variable speed transmission mechanism, in combination, coaxial friction disks having toroidal grooves in their opposed faces, friction rollers cooperating with said grooves, carriers for the rollers, adapted to be rocked on axes inclined to the planes of the disks, and means for shifting the carriers transversely of the axes of rotation of their respective rollers.

18. In a variable speed transmission mechanism, in combination, coaxial friction disks having toroidal grooves in their opposed faces, a rotatable support coaxial with said disks, planetary friction rollers cooperating with said grooves, rockers pivoted on the rotatable support, precessing carriers for the rollers, mounted in the rockers with their axes of precession inclined to the plane of planetary revolution of the rollers, and means for rocking the rockers to shift the carriers transversely of the axes of rotation of their respective rollers.

19. In a variable speed transmission mechanism, in combination, coaxial friction disks having toroidal grooves in their opposed faces, planetary friction rollers cooperating with said grooves, carriers for the rollers, adapted to be rocked on axes inclined to the plane of planetary revolution of the rollers, and a rotatable support for the carriers.

20. In a variable speed transmission mechanism, in combination, a friction disk having a toroidal groove in a face thereof, a friction roller cooperating with said groove, a carrier for the roller, adapted to rock on an axis inclined to the plane of the disk, and supporting means for the carrier.

21. In a transmission mechanism, in combination, friction disks having toroidal grooves in their opposed faces, a friction roller cooperating with the groove, and supporting means carrying the roller for rocking adjustment on an axis transverse to the axis of the roller and inclined to the plane of the disk and defined in position by the supporting means.

22. In a transmission mechanism, in combination, coaxial friction disks having toroidal grooves in their opposed faces, friction rollers cooperating with said grooves, carriers for the rollers, adapted to precess on axes inclined to the planes of the disks, a support for the carriers, and means for shifting the carriers transversely of the axes of rotation of their respective rollers.

23. In a transmission mechanism, in combination, coaxial friction disks having toroidal grooves in their opposed faces, a rotatable supporting element coaxial with the disks, members pivoted on the rotatable element, roller carriers mounted between the pivoted members to rock on longitudinal axes inclined to the planes of the disks, friction rollers cooperating with the grooves in the disks and mounted in the carriers to rotate on axes transverse to the longitudinal axes of their carriers, and a member loosely connected with the pivoted members and capable of rotary movement relative to the supporting element to rock said pivoted members and thereby shift the roller carriers along their longitudinal axes.

24. A transmission mechanism having, in combination, coaxial friction disks provided with grooves of circular cross section in their opposed faces, friction rollers cooperating with the grooves and spaced apart around the axis of the disks, carriers for the rollers adapted to rock on axes transverse to the axes of their respective rollers, rockers between which the carriers extend and by which they are supported, and a support on which the rockers are pivoted.

25. In a transmission mechanism, in combination, coaxial friction disks having toroidal grooves in their opposed faces, a rotatable supporting element coaxial with the disks, members pivoted on the rotatable element, roller carriers mounted between the pivoted members to rock on longitudinal axes, friction rollers cooperating with the grooves in the disks and mounted in the carriers to rotate on axes transverse to the longitudinal axes of their carriers, a member rotatable about the axis of the disks and connected with the pivoted members, and means for effecting relative movement of rotation of the rotatable member and said supporting element to shift the carriers transversely of the axes of their rollers.

26. In a transmission mechanism, in combination, coaxial friction disks having toroidal grooves in their opposed faces, a supporting member, rockers pivotally mounted on the supporting member, carriers carried by the rockers between the disks and mounted in the rockers to rock on longitudinal axes to vary the speed ratio of the mechanism, friction rollers cooperating with the grooves in the disks and mounted in the carriers to rotate on axes transverse to the longitudinal axes of their respective carriers, an element driven through the disks and rollers, and subjecting the carriers and rollers to the reaction of the load; the pivots on which the rockers are mounted being located to give a desired degree of response of the carriers and rollers to the load reaction.

27. In a transmission mechanism, in combination, a driving element, coaxial friction disks having toroidal grooves in their opposed faces, a supporting member coaxial with the disks, rockers pivoted on the supporting member, carriers carried by the rockers and journaled therein to precess on longitudinal axes at an angle to the planes of the disks, friction rollers cooperating with the grooves in the disks and mounted in the carriers to rotate on axes transverse to the longitudinal axes of their respective carriers, and an element driven through the disks and rollers and subjecting the rockers to the reaction of the load.

28. In a transmission mechanism, in combination, a friction driving disk, a friction driven disk coaxial with the first, said disks having toroidal grooves in their opposed faces, planetary friction rollers cooperating with said grooves and mounted for adjustment on axes inclined to their plane of planetary revolution to vary the speed ratio of the mechanism, means operable at will to effect such adjustment of the rollers, means operable to prevent rotation of the driven disk and releasable to permit such rotation, a rotatable driven element, and automatic means for connecting the driven element with the planetary rollers and driven disk when the said adjusting means is in a predetermined position.

29. In a transmission mechanism, in combination, a rotatable driving element, a friction driving disk, a friction driven disk coaxial with the first, said disks having toroidal grooves in their opposed faces, planetary friction rollers cooperating with said grooves and mounted for adjustment on axes inclined to their plane of planetary revolution to vary the speed ratio of the mechanism, fluid-pressure means having a piston movable to produce such adjustment of the rollers, means operable to prevent rotation of the driven disk relative to the first and releasable to permit such rotation, a rotatable driven element, and fluid-pressure means controlled by said piston to connect the driven element with the driven disk and release said rotation-preventing means.

30. In a transmission mechanism, in combination, a rotatable driving element, a friction driving disk, a friction driven disk coaxial with the first, said disks having toroidal grooves in their opposed faces, planetary friction rollers cooperating with said grooves and mounted for adjustment on axes inclined to their plane of planetary revolution to vary the speed ratio of the mechanism, fluid-pressure means having a piston movable to produce such adjustment of the rollers, means operable to prevent rotation of the driven disk relative to the first and releasable to permit such rotation, a rotatable driven element connected with the planetary rollers, and fluid-pressure means controlled by said piston to connect the driven element with the driven disk.

31. In a transmission mechanism, in combination, a rotatable driving element comprising a toroidally grooved friction disk, a rotatable planetary element adapted to be driven by the driving element and comprising friction rollers cooperating with the groove in said disk, a rotatable element comprising a toroidally grooved disk cooperating with said rollers and adapted to be driven thereby, means responsive to the speed of the driving element to prevent rotation of one of the driven elements and releasable to permit rotation thereof, a driven member connected with the other driven element for rotation thereby at a low speed, and means to connect the driven member and said driven elements together for simultaneous rotation at a high speed.

32. In a transmission mechanism, in combination, a friction driving disk, a friction driven disk coaxial with the first, said disks having toroidal grooves in their opposed faces, planetary friction rollers cooperating with said grooves, carriers for the rollers, mounted for adjustment on axes transverse to the axes of the rollers to vary the speed ratio of the mechanism, means operable to produce such adjustment, means operable to prevent rotation of the driven disk and releasable to permit such rotation, a rotatable driven element, means connecting the driven element with the carriers of the planetary rollers for rotation thereby, and automatic means for connecting the driven element with the driven disk when said adjustment producing means is in a predetermined position, said means being responsive to the load reaction of the driven element to disconnect the driven element from the driven disk at appropriate times.

33. In a transmission mechanism, in combination, a rotatable driving element, friction driving disks connected to rotate in unison, a friction driven disk coaxial with the driving disks, said disks having toroidal grooves in their opposed faces, planetary friction rollers arranged in connected sets cooperating with said grooves and mounted for adjustment on axes transverse to their axes of rotation to vary the speed ratio of the mechanism, fluid-pressure means having a piston movable to produce such adjustment of the rollers, a rotatable driven element, means connecting the driven element with a set of planetary rollers, means operable to prevent rotation of the driven disk and releasable to permit such rotation, and fluid-pressure means controlled by said piston to connect the driven element with the driven disk and release said rotation-preventing means.

34. In a transmission mechanism, in combination, coaxial friction driving disks and a coaxial intermediate disk, said disks having toroidal grooves in their opposed faces, planetary friction rollers between the disks, cooperating with the grooves therein and adjustable to vary the speed ratio of the mechanism, control means adapted to be advanced and retracted to advance and retract the rollers to high and low speed-ratio positions respectively, a driven element connected with the planetary rollers for actuation thereby, automatic mechanism to connect the driven element with the intermediate disk when the said control means is advanced to a high speed-ratio position and disconnect said element when the means is retracted to a lower speed-ratio position, and means operating in harmony with the automatic mechanism to prevent and releasable to permit rotation of the intermediate disk.

35. In a transmission mechanism, in combination, a driving shaft, axially spaced coaxial friction driving disks rotated by the driving shaft, an intermediate disk between the driving disks, said disks having toroidal grooves in their opposed faces, planetary friction transmission rollers arranged in sets between said intermediate disk and the driving disks, cooperating with the grooves therein and mounted for precession to vary the speed-ratio of the mechanism, roller carriers mounted for precession of the rollers, rotatable carrier supports connected to revolve in unison around the axis of the disks, means responsive to the speed of the driving shaft to cause precession of the rollers and having a member movable in correspondence with such precession, automatic means to prevent rotation of the intermediate disk and releasable to permit such rotation, a driven element, means connecting the driven element to one set of rollers, automatic means to connect the driven element with the intermediate disk when the aforesaid member reaches a predetermined position in its movement, and automatic means operating in harmony with the last mentioned means to release the intermediate disk to permit rotation of the latter.

36. In a transmission mechanism, in combination, coaxial friction disks having toroidal grooves in their opposed faces, a driving element to rotate one of said disks, friction rollers between the disks, cooperating with the grooves therein and mounted for adjustment to vary the speed ratio of the mechanism, a driven element, means for rotating the driven element through the disks and rollers at speed ratios less than unity, automatic direct-drive mechanism for driving the driven element at the speed of the driving element when the driven element is rotated at a predetermined speed, means controlled by the operator to determine such speed of the driven element, and means controlled by the operator to prevent adjustment of the rollers from a lower to higher speed-ratio positions.

37. In a transmission mechanism, in combination, a friction driving disk, a friction disk coaxial with the first, said disks having toroidal grooves in their opposed faces, automatic means responsive to the speed of the driving disk to prevent and releasable to permit rotation of the second disk, planetary friction rollers cooperating with the disks to drive the second named from the first when rotation of the second is permitted, a driven element connected with the planetary rollers for rotation thereby when rotation of the second disk is prevented, mechanism for adjusting the rollers to vary the speed-ratio of the transmission mechanism, and automatic means operable at a predetermined speed-ratio adjustment of the rollers to drive the driven element at the speed of the driving disk.

38. In a transmission mechanism, in combination, a rotatable driving element, coaxial friction driving disks, a friction driven disk between and coaxial with the driving disks, said disks having toroidal grooves in their opposed faces, planetary friction rollers arranged in connected sets cooperating with said grooves and mounted for rocking adjustment on axes inclined to their plane of planetary revolution to vary the speed ratio of the mechanism, a rotatable driven element, means connecting the driven element with a set of planetary rollers, fluid pressure means having a piston movable to produce speed-varying adjustment of the rollers in accordance with the extent of movement of the piston, means operable to prevent rotation of the driven disk relative to the driving disks and releasable to permit such rotation; means for connecting the driven element with the driven disk; and fluid-pressure mechanism controlled by said piston, comprising a cylinder, a piston movable therein in response to fluid pressure to actuate the last mentioned means when the first-mentioned piston is in a predetermined position, and another piston movable in the cylinder in response to fluid pressure, to release the means for preventing rotation of the driven disk.

39. In a transmission mechanism, in combination, a rotatable driving element, coaxial friction driving disks, a friction driven disk coaxial with the driving disks, said disks having toroidal grooves in their opposed faces, planetary friction rollers arranged in connected sets cooperating with said grooves and mounted for adjustment on axes inclined to their plane of planetary revolution to vary the speed ratio of the mechanism, a rotatable driven element, means connecting the driven element with a set of planetary rollers and subjecting the same to the load reaction of said element, fluid pressure means having a piston movable in response to the speed of the driving element and against the load reaction of the driven element to produce speed-varying adjustment of said rollers, means operable to prevent rotation of the driven disk and operable to permit such rotation, means for connecting and disconnecting the driven element and the driven disk; and fluid-pressure mechanism controlled by said piston, comprising a cylinder, a piston movable therein in response to fluid pressure for actuating the last mentioned means to connect the driven element and the relatively rotatable disk when the first named piston is advanced to a predetermined position by the fluid pressure and disconnect the same when the piston is moved back from said position by the load reaction of the driven element, and another piston movable in the cylinder in response to fluid pressure, to operate the rotation-preventing means to prevent and permit rotation of the driven disk in harmony with the means for connecting and disconnecting the driven element and the driven disk.

40. In a transmission mechanism, in combination, a rotatable driving element, coaxial friction driving disks rotated thereby, a friction driven disk coaxial with and between the driving disks, said disks having toroidal grooves in their opposed faces, planetary friction rollers arranged in connected sets cooperating with said grooves and mounted for adjustment on axes inclined to their plane of planetary revolution to vary the speed ratio of the mechanism, said sets of rollers being mounted to revolve in unison, a rotatable driven element, means connecting the driven element with a set of planetary rollers for rotation thereby and subjecting the rollers to the reaction of the driven element, fluid pressure means having a cylinder and a piston movable therein in response to the fluid pressure to produce speed varying adjustment of the rollers, means for supplying fluid to the cylinder in accordance with the speed of the driving element to actuate the piston, means operable to prevent rotation of the driven disk and operable to permit such rotation comprising a brake-drum connected with the driven disk and a brake-band associated with the drum, means for connecting the driven element with the driven disk comprising a clutch member connected with the driven disk and a cooperating clutch member connected with the driven element, and fluid-pressure mechanism controlled by said piston, comprising a cylinder, and piston means movable therein in response to fluid pressure to actuate the aforesaid brake-band and second mentioned clutch member.

41. In a transmission mechanism, in combination, a rotatable driving element, coaxial friction driving disks driven thereby, a friction driven disk coaxial with the driving disk, said disks having toroidal grooves in their opposed faces, planetary friction rollers arranged in sets cooperating with said grooves and mounted for adjustment on axes inclined to their plane of planetary revolution to vary the speed ratio of the mechanism, said sets being connected to revolve in unison, a rotatable driven element, means connecting the driven element with a set of planetary rollers, means responsive to the speed of the driving element and the load reaction of the driven element for producing speed-varying adjustment of the rollers and having a control member moving in correspondence with the adjustment of said rollers, automatic means operable to prevent rotation of the driven disk and releasable to permit such rotation, automatic means operating to connect the driven element with the driven disk when the said control member reaches a predetermined position, and fluid-pressure mechanism controlled by said control member, comprising a piston movable in response to fluid pressure, to release the means for preventing rotation of the driven disk when the control member reaches said predetermined position.

42. In a transmission mechanism, in combination, coaxial driving disks and an intermediate disk having toroidal grooves in their opposed faces, first and second sets of planetary friction rollers mounted to revolve in unison between the driving disks and intermediate disk and cooperating with the grooves therein, said rollers being mounted for adjustment to vary the speed-ratio of the transmission mechanism, means responsive to the speed of the driving disks to produce speed-varying adjustment of the rollers, a driven shaft coaxial with the disks, a drum coaxial with the disks and connected to the driven shaft and shiftable into connection with the second set of rollers or with the intermediate disk, to rotate the driven shaft, a second drum coaxial with the disks and shiftable into connection with the intermediate disk or with the first set of rollers, for rotation thereby, means operable to shift said drums, means to prevent rotation of the second drum and releasable to permit such rotation, and means to connect the driven shaft with the second drum when the rollers are in a predetermined position of adjustment.

43. In a transmission mechanism, in combination, coaxial driving disks and an intermediate disk having toroidal grooves in their opposed faces, first and second sets of planetary friction rollers mounted to revolve in unison between the driving disks and intermediate disk and cooperating with the grooves therein, a driven shaft coaxial with the disks, a drum coaxial with the disks and connected to the driven shaft and shiftable into connection with the second set of rollers or with the intermediate disk, to rotate the driven shaft, a second drum coaxial with the disks and shiftable into connection with the intermediate disk or with the first set of rollers, for rotation thereby, means operable to shift said drums, and means to prevent rotation of the second drum and releasable to permit such rotation.

44. In a transmission mechanism, in combination, coaxial driving disks, an intermediate disk between the driving disks said disks having toroidal grooves in their opposed faces, first and second sets of planetary rollers mounted to revolve in unison between the intermediate disk and the driving disks and cooperating with the grooves therein, a driven shaft, means operable at will for connecting the driven shaft with the second set of rollers or with the intermediate disk, a rotatable element adapted to be connected with the intermediate disk or with the first set of rollers, and means to prevent rotation of the rotatable element and releasable to permit such rotation.

45. In a transmission mechanism, in combination, a driving shaft, axially spaced coaxial friction driving disks rotated by the driving shaft, an intermediate disk between the driving disks, said disks having toroidal grooves in their opposed faces, planetary friction transmission rollers arranged in sets to revolve in unison between said intermediate disk and the driving disks and cooperating with the grooves therein, means to prevent rotation of the intermediate disk and releasable to permit such rotation, a driven element, means operable to connect the driven element to one set of rollers for forward drive or to the intermediate disk for reverse, and means operable to prevent planetary revolution of the rollers.

46. In a transmission mechanism, in combination, a driving shaft, axially spaced coaxially friction driving disks rotated by the driving shaft, an intermediate disk between the driving disks, said disks having toroidal grooves in their opposed faces, planetary friction transmission rollers arranged in sets between said intermediate disk and the driving disks and cooperating with the grooves therein, roller carriers mounted for precession of the rollers, rotatable carrier supports connected to revolve in unison, means responsive to the speed of the driving shaft to cause precession of the rollers, means to prevent rotation of the intermediate disk and releasable therefrom to permit such rotation, a driven element, means operable to connect the driven element to one set of rollers for forward drive or to the intermediate disk for reverse, and means operable to prevent planetary revolution of the rollers.

47. In a transmission mechanism, in combination, coaxial friction driving disks and a relatively rotatable coaxial intermediate disk, planetary friction rollers arranged in sets between the driving disks and the intermediate disk to cooperate therewith to drive the intermediate disk, rotation-preventing means, mechanism operable to connect the rotation-preventing means with the driven disk or with the planetary rollers, a driven element, mechanism operable to connect the driven element with the planetary rollers or with the driven disk, and operator-controlled means common to both said mechanisms to operate the same.

48. In a transmission mechanism, in combination, relatively rotatable coaxial friction disks having toroidal grooves in their opposed faces, interposed planetary friction rollers cooperating with the disks to drive one from the other and adjustable for change of speed ratio, a driven element, means operable at will to drive the driven element from the planetary rollers or from the driven disk, and automatic means operating in response to the speed of the driving disk to adjust the rollers for change of speed ratio, said means being operable only when the driven element is driven from the planetary rollers.

49. In a transmission mechanism, in combination, a driving disk, a coaxial driven disk constituting a driven member, said disks having toroidal grooves in their opposed faces, a driven member comprising interposed planetary friction rollers cooperating with the disks and adjustable to vary the speed-ratio of the mechanism, a driven element, means operable at will to drive the driven element from either driven member, and means operable only when the driven element is driven from one of said members to adjust the rollers for change of speed-ratio.

50. In a transmission mechanism, in combination, coaxial relatively rotatable elements and an interposed planetary element to drive one rotatable element from the other. a driven member, means for driving the driven member from the planetary element or from the driven rotatable element as desired, automatic fluid pressure mechanism operating in harmony with said means to prevent rotation of the planetary element or the driven rotatable element, and operator-operated means to control the fluid pressure mechanism.

51. In a transmission mechanism, in combination, relatively rotatable coaxial friction disks and interposed planetary rollers cooperating therwith to drive one from the other, a driven element, selectively operable means for connecting the driven element with the planetary rollers for rotation thereby in one direction or with the driven disk for rotation in the opposite direction, and automatic mechanism operating in harmony with said means to prevent revolution of the rollers or rotation of the driven disk.

52. In a transmission mechanism, in combination, coaxial friction disks having toroidal grooves in their opposed faces, a driving element to drive one of the disks, planetary friction rollers between the disks and cooperating therewith to drive the other disk, and fluid pressure mechanism responsive to the speed of the driving element to prevent rotation of the said other disk relatively to the first.

53. In a transmission mechanism, in combination, a friction driving element, a planetary friction element driven thereby, a rotatable friction element driven by the driving element through the planetary element, and fluid pressure operated means responsive to the speed of the driving element to prevent rotation of the rotatable element.

54. In a transmission mechanism, in combination, a rotatable friction driving element, a planetary friction element cooperating with the driving element and adapted to be driven thereby, a coaxial friction element cooperating with the planetary element and adapted to be driven thereby, power-actuated releasable means to hold one of said driven elements stationary, and operator-controlled means responsive to the speed of the driving element to control the power-actuated means.

55. In a transmission mechanism, in combination, a rotatable driving element, a rotatable element coaxial therewith, automatic means responsive to the speed of the driving element to prevent and releasable to permit rotation of the second element, a planetary element cooperating with the first and second elements to drive the second when rotation of the second is permitted, and a driven member connected with the planetary element for rotation thereby when rotation of the second element is prevented.

56. In a transmission mechanism, in combination, a friction driving disk, a friction disk coaxial with the first, automatic means responsive to the speed of the driving disk to prevent and releasable to permit rotation of the second disk, planetary friction rollers cooperating with the disks to drive the second from the first when rotation of the second is permitted, a driven element connected with the planetary rollers for rotation thereby when rotation of the second disk is prevented, and operator-operated means to control the speed-responsive means.

57. In a transmission mechanism, in combination, coaxial relatively rotatable friction disks, interposed planetary friction rollers cooperating with the disks to drive one from the other and adjustable to vary the speed ratio of the mechanism, a driven element actuated by the planetary rollers, and automatic means responsive to the speed of the driving disk to prevent rotation of the driven disk.

58. In a transmission mechanism, in combination, coaxial driving elements and a coaxial intermediate driven element, a set of planetary elements cooperating with the intermediate element and one of the driving elements, a set of planetary elements cooperating with the same intermediate element and with the other driving element, said sets of planetary elements connected to revolve together, a driven member connected with the planetary elements, and means operable to prevent rotation of the intermediate element and releasable to permit such rotation.

59. In a transmission mechanism, in combination, a rotatable driving element, a rotatable planetary element adapted to be driven by the driving element, a rotatable element adapted to be driven by the planetary element, means responsive to the speed of the driving element to prevent and releasable to permit rotation of one of said driven elements, and a driven member connected with the other driven element for rotation thereby.

60. In a transmission mechanism, in combination, a shaft, axially spaced friction disks thereon, an intermediate coaxial friction disk between the axially spaced disks, said disks having toroidal grooves in their opposed faces, a sleeve rotatable on the shaft between the axially spaced disks and extending through the intermediate disk, sets of planetary friction rollers cooperating with the disks and carried by the sleeve to revolve together, means for adjusting the rollers to vary the speed ratio of the mechanism, and means operable to prevent rotation of the intermediate disk and releasable to permit such rotation.

61. In a transmission mechanism, in combination, a friction driving disk, a friction disk coaxial with the first, said disks having toroidal grooves in their opposed faces, automatic means responsive to the speed of the driving disk to prevent and releasable to permit rotation of the second disk, planetary friction rollers cooperating with the disks to drive the second from the first when rotation of the second is permitted, a driven element connected with the planetary rollers for rotation thereby when rotation of the second disk is prevented, mechanism responsive to the speed of the driving disk to adjust the rollers for variation of the speed-ratio of the transmission mechanism, and operator-operated means to control the speed-responsive means.

62. In a variable speed transmission mechanism, in combination, a driving element, a planetary element driven thereby, a rotatable element driven by the driving element through the planetary element, fluid pressure operated means responsive to the speed of the driving element to prevent rotation of the rotatable element, automatic means responsive to the speed of the driving element to vary the speed ratio of the mechanism, and means to prevent operation of the fluid pressure operated means at a low speed of the driving element.

63. In a transmission mechanism, in combination, coaxial friction disks, a driving element to rotate one of the disks, planetary friction rollers between the disks, cooperating therewith to drive the other disk and adjustable to vary the speed ratio of the mechanism, fluid pressure operated means responsive to the speed of the driving element to control the rotation of said other disk, and means to prevent operation of the fluid pressure operated means at a low speed of the driving element.

64. In a transmission mechanism, in combination, coaxial friction disks having toroidal grooves in their opposed faces, a driving element to rotate one of said disks, friction rollers between the disks, cooperating with the grooves therein and mounted for adjustment to vary the speed ratio of the mechanism, a driven element driven through the disks and rollers at a speed corresponding to the speed ratio position of the rollers, fluid pressure operated means responsive to the speed of the driving element to effect speed-varying adjustment of the rollers, automatic direct drive mechanim for driving the driven element at the speed of the driving element when the rollers are in a predetermined speed ratio position, an operator-operated fluid pressure control valve for controlling said automatic mechanism, and a fluid pressure control valve under the control of the operator to prevent response of the fluid pressure operated means to the speed of the driving element.

65. In a transmission mechanism, in combination, coaxial friction disks having toroidal grooves in their opposed faces, a driving element to rotate one of said disks, friction rollers between the disks, cooperating with the grooves therein and mounted for adjustment to vary the speed ratio of the mechanism, fluid pressure operated means responsive to the speed of the driving element to effect speed-varying adjustment of the rollers, and a fluid pressure valve under control of the operator to control the response of the fluid pressure means to the speed of the driving element.

66. In a transmission mechanism, in combination, coaxial friction disks having toroidal grooves in their opposed faces, a driving element to rotate one of said disks, friction rollers between the disks, cooperating therewith and mounted for adjustment to vary the speed-ratio of the mechanism, fluid pressure operated means responsive to the speed of the driving element to effect adjustment of the rollers for increase of speed-ratio, a driven element connected with the rollers and opposing said speed-varying adjustment thereof by said fluid pressure means, a spring also opposing said speed-varying adjustment of the rollers, and means controlled by the operator to control the speed-varying operation of the fluid pressure operated means.

67. In a transmission mechanism, in combination, coaxial friction disks having toroidal grooves in their opposed faces, friction rollers cooperating with the grooves in the disks and adjustable to vary the speed ratio of the mechanism, a driving element, an element driven through the disks and rollers at a speed ratio less than unity and subjecting the rollers to the reaction of a load, means responsive to the speed of the driving element and the reaction of the load to effect speed-ratio adjustment of the rollers, a spring opposing response of said means to the speed of the driving element, and means for driving the driven element at unity ratio upon predetermined response of the roller adjusting means to the speed of the driving element.

68. In a transmission mechanism, in combination, friction driving disks and a coaxial intermediate disk having toroidal grooves in their opposed faces, planetary friction rollers arranged in sets between the driving disks and the intermediate disk, cooperating with the grooves in said disks and adjustable to vary the speed ratio of the mechanism, and a driven member connected with the sets of planetary rollers for actuation thereby.

69. In a transmission mechanism, in combination, friction driving disks, a coaxial intermediate disk, said disks having toroidal grooves in their opposed faces, planetary friction rollers arranged in connected sets to revolve together between the intermediate disks and the driving disk, cooperating with the grooves in the said disks and adjustable to vary the speed ratio of the mechanism, and means responsive to the speed of the driving disks for adjusting the planetary rollers while the same are revolving, to vary the speed ratio of the mechanism.

70. In a transmission mechanism, in combination, friction driving disks and a coaxial intermediate disk having toroidal grooves in their opposed faces, and planetary friction rollers arranged in sets between the driving disks and the intermediate disk and connected to revolve together, said rollers cooperating with the grooves in said disks and adjustable to vary the speed ratio of the mechanism.

71. In a transmission mechanism, in combination, a shaft, axially spaced friction disks thereon, an intermediate coaxial friction disk between the axially spaced disks, said disks having toroidal grooves in their opposing faces, and sets of planetary friction rollers cooperating with the disks and connected to revolve at the same angular speed.

72. In a transmission mechanism, in combination, a plurality of friction disks having toroidal grooves in their opposed faces, connected sets of planetary friction rollers between the disks, cooperating with the grooves therein and adjustable to vary the speed ratio of the mechanism, a driven element, means for driving the driven element from the planetary rollers, and fluid-pressure mechanism for controlling said driving means.

73. In a transmission mechanism, in combination, an element comprising coaxial outer disks spaced apart axially and having toroidal grooves in their inner faces, an element comprising an intermediate disk coaxial with the first mentioned disks and having toroidal grooves in its faces, an element comprising connected sets of friction rollers arranged between the outer disks and the intermediate disk, cooperating with the grooves in said disks and adjustable to vary the speed ratio of the mechanism, driving means coaxial with said disks and connected with one of the said elements to drive the same, and a driven shaft coaxial with the disks and connected with another of said elements for actuation thereby.

74. In a transmission mechanism, in combination, an outer rotatable friction element having inwardly facing toroidal grooves, an intermediate rotatable friction element having outwardly facing toroidal grooves, friction driving rollers arranged in sets between said rotatable friction elements, cooperating with the grooves therein and adjustable to vary the speed ratio of the mechanism, and torque-carrying means concentric with one of said rotatable elements and connecting said sets of rollers together to prevent rotation of one set relative to another.

75. In a transmission mechanism, in combination, an element comprising a shaft and axially spaced friction disks having toroidal grooves in their inner faces, an element comprising a friction disk between the axially spaced disks and having toroidal grooves in its faces, friction rollers arranged in sets between the intermediate disk and the axially spaced disks, cooperating with the grooves in the disks to drive one of said elements from the other at variable speed, roller supports concentric with said shaft, a rotatable member concentric with the disks and driven by power transmitted by the disks and rollers, and a member concentric with said shaft and connecting the roller supports rigidly together, said member being the sole connection between said supports.

76. In a transmission mechanism, in combination, coaxial friction driving disks, a coaxial intermediate friction disk, planetary friction rollers connected in sets to revolve in unison between the intermediate disk and the driving disks and adjustable to vary the speed-ratio of the mechanism, revolving means for adjusting the rollers of one set while the same are revolving, supporting means for the rollers of the other set, and a torque-carrying member connected with the rollers of said other set and causing the same to follow the adjustment of the first set.

77. In a transmission mechanism, in combination, coaxial friction driving disks, a coaxial intermediate friction disk, a set of planetary friction rollers arranged between the intermediate disk and one of the driving disks and adjustable to vary the speed-ratio of the mechanism, means for adjusting the rollers of said set, a set of planetary friction rollers connected with the first set to revolve in unison therewith and arranged between the intermediate disk and the other driving disk, cooperating therewith and adjustable for speed-ratio variation, supporting means for the rollers of the last mentioned set, and a torque-carrying member connected with the rollers of the last mentioned set and causing the same to follow the speed-ratio adjustment of the first set.

78. In a transmission mechanism, in combination, a rotatable driving element, friction driving disks connected with the driving element for rotation thereby, an interposed friction disk coaxial with the driving disks between the same and rotatable relatively thereto, said disks having toroidal grooves in their opposed faces, planetary friction rollers arranged in sets between the disks and connected to revolve at the same angular speed around the disk-axis, said rollers cooperating with the grooves in the disks and adjustable to vary the speed ratio of the mechanism, a driven element, means connecting the driven element with the planetary rollers of one set for rotation thereby, and means for equalizing the load on the driven element between the sets of rollers.

79. In a transmission mechanism, in combination, a rotatable driving element, friction driving disks connected with the driving element for rotation thereby, an interposed friction disk coaxial with the driving disks between the same and rotatable relatively thereto, said disks having toroidal grooves in their opposed faces, planetary friction rollers arranged in sets between the disks, cooperating with the grooves therein and adjustable to vary the speed ratio of the mechanism, a driven element for driving a load, and means associating the driven element with the sets of planetary rollers for rotation thereby with the load on the driven element equally divided between said sets.

80. In a transmission apparatus, in combination, coaxial friction disks and a coaxial intermediate friction disk, said disks having toroidal grooves in their opposed faces, friction rollers arranged in sets between the disks, cooperating therewith and adjustable in unison to vary the speed ratio of the apparatus, speed-ratio control mechanism associated with one of said sets of rollers, mechanism for driving a load by power transmitted by the disks and rollers, and an annular equalizing member loosely connected with at least one of said mechanisms.

81. In a transmission apparatus, in combination, coaxial friction disks having toroidal grooves in their opposed faces, friction rollers arranged between the disks in connected sets, cooperating with the grooves in the disks and adjustable to vary the speed ratio of the apparatus, speed-ratio control mechanism for the rollers, mechanism for driving a load by power transmitted by the disks and rollers, and an annular equalizing member loosely connected with the said control mechanism.

82. In a transmission mechanism, in combination, coaxial friction disks having toroidal grooves in their opposed faces, planetary friction rollers between the disks, cooperating with the grooves therein and adjustable to vary the speed ratio of the mechanism, and revolving cam-actuated mechanism to produce such adjustment of the rollers.

83. In a transmission mechanism, in combination, coaxial friction disks having toroidal grooves in their opposed faces, a driving element connected with one of the disks, planetary rollers between the disks, cooperating with the grooves therein and mounted for precession to vary the speed ratio of the mechanism, a driven element, means connecting the rollers and the driven element to drive the latter and subject the rollers to the reaction of the load to cause precession of the rollers to a lower speed ratio position, cam mechanism connected with the rollers to cause precession thereof to a higher speed ratio position, and mechanism operating in correspondence with the speed of the driving element to actuate the cam mechanism against the reaction of the load.

84. In a transmission mechanism, in combination, coaxial friction disks having toroidal grooves in their opposed faces, planetary friction rollers between said disks, cooperating with the grooves therein and mounted for precession to vary the speed ratio of the mechanism, revolving concentric drums connected with the rollers and capable of rotation relative to each other to cause precession of the rollers, and revolving means to rotate said drums relatively to each other.

85. In a transmission mechanism, in combination, coaxial friction disks having toroidal grooves in their opposed faces, planetary friction rollers arranged between the disks to revolve around the disk axis, cooperating with the grooves in the disks and adjustable to vary the speed ratio of the mechanism, revoluble drums connected with the rollers and adapted for rotary movement relative to each other for effecting speed-varying adjustment of the rollers, and revolving means for effecting such relative rotary movement of the drums.

86. In a transmission mechanism, in combination, a rotatable friction element, a rotatable friction element coaxial therewith, an element comprising planetary friction rollers between the first-mentioned elements to drive one from the other, one-way brake mechanism to prevent rotation of the driven element in one direction, and means operable at will to prevent rotation of the driven element in the opposite direction.

87. In a transmission mechanism, in combination, a rotatable friction element, a rotatable friction element coaxial therewith, an element comprising planetary friction rollers between the first-mentioned elements to drive one from the other, fluid pressure operated one-way brake mechanism to prevent rotation of the driven element in one direction, and a fluid pressure control valve operable at will to prevent rotation of the driven element in the opposite direction.

88. In a transmission mechanism, in combination relatively rotatable coaxial friction disks, planetary friction rollers between the disks and cooperating therewith to rotate one disk from the other, fluid pressure operated one-way brake mechanism to prevent rotation of said disk, and a driven element connected with the planetary rollers for actuation thereby.

89. In a transmission mechanism, in combination, an element comprising coaxial friction disks having toroidal grooves in their inner faces; a rigid connection between said disks; an element comprising a coaxial intermediate friction disk between the first mentioned disks and having toroidal grooves in its faces; an element comprising a set of friction rollers cooperating with the intermediate disk and one of the first mentioned disks, a set of friction rollers cooperating with the intermediate disk and the other of the first mentioned disks, supports for the friction rollers, and a rigid connecting means between said supports; a driving shaft coaxial with and directly connected with one of said elements; and a coaxial driven shaft connected with another of said elements.

90. In a transmission mechanism, in combination, an element comprising coaxial rotatable friction disks having toroidal grooves in their inner faces; an element comprising an intermediate coaxial friction disk between the first mentioned disks and having toroidal grooves in its faces; an element comprising a set of friction rollers cooperating with the intermediate disk and one of the first mentioned disks, a support for the rollers, a set of friction rollers cooperating with the intermediate disk and the other of the first mentioned disks, and a support for the last mentioned rollers, all said rollers being adjustable to vary the speed ratio of the mechanism; a driving member coaxial with said elements and connected to one of the same; a driven member coaxial with said elements and connected with another of the same; and means for preventing rotation of the remaining elements.

91. In a transmission mechanism, in combination, three friction elements, comprising three toroidally grooved coaxial disks and cooperating sets of friction rollers adjustable to vary the speed ratio of the mechanism, a coaxial driving member connected with one of said elements to rotate the same, a coaxial driven member connected with another of said elements for rotation thereby, and means preventing rotation of the remaining element whereby the same serves as a reaction element.

92. In a transmission mechanism, in combination, toroidally grooved coaxial friction disks, planetary friction rollers cooperating with said disks, roller-supporting devices mounted for adjustment of the rollers to vary the speed ratio of the mechanism, a driven member coaxial with the disks, and connecting means between the driven member and the roller supporting devices to drive the former, said connecting means being radially shiftable to cause equalizing adjustment of the rollers.

93. In a transmission mechanism, in combination, toroidally grooved coaxial friction disks, friction rollers cooperating with the disks, roller supporting devices mounted for rocking adjustment to vary the speed ratio of the mechanism, a member driven through the disks and rollers, and a radially shiftable equalizing member connected with the driven member and the roller supporting devices to produce equalizing adjustment of the rollers.

94. In a transmission mechanism, in combination, toroidally grooved coaxial friction disks, friction rollers cooperating with the disks, supporting devices for the rollers mounted for rocking adjustment to vary the speed ratio of the mechanism, and a torque-responsive radially shiftable equalizing member connected with the rollers.

95. In a transmission mechanism, in combination, toroidally grooved coaxial friction disks, friction rollers cooperating with the disks, supporting devices for the rollers mounted for speed-varying adjustment, and an eccentrically movable equalizing member coaxial with the disks and connected with the roller supporting devices to maintain equal division of the driving load among said rollers.

96. In a transmission mechanism, in combination, radially grooved friction disks, friction rollers cooperating with the disks, supporting devices for the rollers mounted for speed-varying adjustment thereof, and load-equalizing means coaxial with the disks, connected with the roller supporting devices and adapted to take an eccentric position relative thereto to maintain equal division of the driving load among the rollers.

97. In a transmission mechanism, in combination, friction disks and friction rollers cooperating therewith, and means supporting the rollers enabling the same to rock on axes determined at all times by the roller supporting means and inclined to the disks.

98. In a transmission mechanism, in combination, toroidally grooved coaxial friction disks, friction rollers cooperating with the disks, rocking carriers for the rollers mounted for movement to permit load-responsive precessional adjustment of the rollers on axes inclined to the disks, and means predetermining the energy required to effect a given precession-producing movement of the carriers.

99. In a transmission mechanism, in combination, toroidally grooved coaxial friction disks, friction rollers cooperating with the disks, carriers for the rollers, rockers between which the carriers are pivotally mounted for load-responsive precessional adjustment of the rollers on axes inclined to the disks to vary the speed ratio of the mechanism, and a supporting member on which the rockers are pivotally mounted at points positioned to give the rockers a desired load-response.

100. In a transmission mechanism, in combination, a shaft, outer rotatable friction elements fixed on said shaft and having inwardly facing toroidal grooves, an intermediate rotatable friction element having outwardly facing toroidal grooves, friction driving rollers arranged in sets between said rotatable friction elements, cooperating with the grooves therein and mounted for precessional adjustment to vary the speed ratio of the mechanism, and torque-carrying means concentric with one of said rotatable elements and connecting said sets of rollers together to prevent rotation of one set relative to another.

101. In a transmission mechanism, in combination, a shaft, outer axially spaced rotatable friction elements fixed on said shaft and having inwardly facing toroidal grooves, an intermediate rotatable friction element coaxial with the outer element and having outwardly facing toroidal grooves, friction driving rollers arranged in sets between said rotatable friction elements, cooperating with the grooves therein and mounted for precessional adjustment to vary the speed ratio of the mechanism, torque-carrying means concentric with one of said rotatable elements and connecting said sets of rollers together to prevent rotation of one set relative to another, a rotatable member surrounding one of the sets of rollers and one of said outer elements and connected with the intermediate element, and means for causing precessional adjustment of the rollers.

102. In a transmission mechanism, in combination, toroidally grooved coaxial friction disks, rotatable friction rollers cooperating with the disks, carriers in which the rollers are mounted for precessional rocking adjustment to vary the speed ratio of the mechanism, a member stationary relative to the rollers, and non-rotatable stop-members on the carriers, between the said relatively stationary member and the respective rollers to cooperate with said relatively stationary member to limit the precessional rocking adjustment of the rollers.

103. In a transmission mechanism, in combination, toroidally grooved coaxial friction disks, rotatable friction rollers cooperating with the disks, carriers in which the rollers are mounted for precessional rocking adjustment to vary the speed ratio of the mechanism, means connected with the rollers and movable to cause such precessional adjustment in proportion to the extent of movement of said movable means, and stop-means limiting movement of said movable means to a predetermined range.

104. In a transmission mechanism, in combination, toroidally grooved coaxial friction disks, rotatable friction rollers cooperating with the disks, carriers in which the rollers are mounted for precessional rocking adjustment to vary the speed ratio of the mechanism, a member stationary relative to the rollers, non-rotatable stop-members on the carriers, between the said relatively stationary member and the respective rollers to cooperate with said relatively stationary member to limit the precessional rocking adjustment of the rollers, means connected with the rollers and movable to cause such precessional adjustment in proportion to the extent of movement of said movable means, and stop-means limiting movement of said movable means to a predetermined range.

In testimony whereof I hereto affix my signature.

FRANK A. HAYES.

CERTIFICATE OF CORRECTION.

Patent No. 1,865,102. June 28, 1932.

FRANK A. HAYES.

It is hereby certified that error appears in the printed specification of the above numbered patent requiring correction as follows: Page 4, lines 122 and 125, for "torque" read load; page 12, line 104, claim 5, for "disks" read disk; and that the said Letters Patent should be read with these corrections therein that the same may conform to the record of the case in the Patent Office.

Signed and sealed this 11th day of October, A. D. 1932.

(Seal)

M. J. Moore,
Acting Commissioner of Patents.